(12) United States Patent
Kim et al.

(10) Patent No.: US 10,676,653 B2
(45) Date of Patent: Jun. 9, 2020

(54) ADHESIVE HAVING ANTI-INSECT EFFICIENCY

(71) Applicant: NONGSHIM CO., LTD, Seoul (KR)

(72) Inventors: Byoung Il Kim, Anyang-si (KR); Young Jin Lee, Anyang-si (KR); Jong Bae Byun, Anyang (KR); Ja Hyun Na, Goyang-si (KR)

(73) Assignee: NONGSHIM CO., LTD, Seoul (KR)

( * ) Notice: Subject to any disclaimer, the term of this patent is extended or adjusted under 35 U.S.C. 154(b) by 132 days.

(21) Appl. No.: 16/032,735

(22) Filed: Jul. 11, 2018

(65) Prior Publication Data

US 2020/0017733 A1 Jan. 16, 2020

(51) Int. Cl.

| | | |
|---|---|---|
| *C09J 123/12* | (2006.01) | |
| *A01N 65/12* | (2009.01) | |
| *A01N 65/24* | (2009.01) | |
| *C09J 101/26* | (2006.01) | |
| *C09J 7/35* | (2018.01) | |
| *A01N 65/28* | (2009.01) | |
| *C08K 5/00* | (2006.01) | |
| *C09J 9/00* | (2006.01) | |
| *C09J 11/06* | (2006.01) | |

(52) U.S. Cl.
CPC ............... *C09J 123/12* (2013.01); *C09J 7/35* (2018.01); *C09J 101/26* (2013.01); *A01N 65/12* (2013.01); *A01N 65/24* (2013.01); *A01N 65/28* (2013.01); *C08K 5/0058* (2013.01); *C09J 9/00* (2013.01); *C09J 11/06* (2013.01); *C09J 2205/102* (2013.01)

(58) Field of Classification Search
None
See application file for complete search history.

(56) References Cited

U.S. PATENT DOCUMENTS

2013/0029976 A1 1/2013 Shimokawatoko

FOREIGN PATENT DOCUMENTS

| JP | 3370610 A | 2/2000 |
|---|---|---|
| JP | 2005307124 A | 11/2005 |
| KR | 1008464340000 B1 | 1/2007 |
| KR | 1020170112091 B1 | 10/2017 |
| WO | WO 2009/098175 A1 * | 8/2009 |

OTHER PUBLICATIONS

Abstract for CN 102416074 A (Apr. 2012).*
Abstract for JP 59-128325 (Jul. 1984).*
Abstract for WO 2017/088616 (Jun. 2017).*
Machine translation of WO 2017/088616 (no date).*
Korean Office Action dated Apr. 27, 2017 in connection with the counterpart Korean Patent Application No. 10-2016-0038637.

* cited by examiner

*Primary Examiner* — Marc S Zimmer
(74) *Attorney, Agent, or Firm* — Hauptman Ham, LLP

(57) ABSTRACT

The present invention relates to an adhesive comprising an anti-insect ingredient comprising a plant extract, wherein the plant extract comprises an extract of *Cinnamomum cassia*, an extract of *Syzygium aromaticum* and an extract of *Artemisia capillaris* and an adhesive ingredient comprising a binder. The adhesive is environment friendly and does not have any toxic ingredient on a human body and exhibit excellent and synergic anti-insect efficiency by using three plant extracts. Therefore, it is possible to control pests that may have an adverse effect on foods by applying the adhesive to a food package box.

18 Claims, 18 Drawing Sheets

ADHESIVE HAVING ANTI-INSECT EFFICIENCY

BACKGROUND OF THE INVENTION

Field of the Invention

The present invention relates to an adhesive, and more specifically, to an environment friendly adhesive that is used for controlling harmful insects without side effects on a human body.

Discussion of the Related Art

There often happen filtrations of foreign materials originated from insects into an inside of foods or an inside of food packages during manufacturing or distributing foods. As national consciousness to food safeties and foreign materials in the foods increase rapidly, reliability to the food hygiene and food safeties of the company that manufactures the food is decreased when the foreign materials such as insects are introduced into the foods or the food packages. The filtration of foreign materials originated from insect into foods has caused social issues around the world. According to a report of Korean Food and Drug Administration, insects are the most common materials among the foreign materials found in the foods. Such insect-originated foreign materials found in the foods include living materials such as eggs, larvae, pupae and imagoes, as well as insects' dead bodies, insects' debris, insects' development remnants, and insects' excrements.

Food manufactures have taken positive measures to the foreign materials issues because sales amount of the related foods can be decreased owing to damages of the company's reputation caused by press reports about the foreign materials and consumers can file claims for the foreign materials when insects are incorporated into the foods. Accordingly, the contaminations caused by the filtration of foreign materials in artificially manageable processes, for example, in the food ingredients and in production processes have been decreased dramatically.

But, global warming has changed climatic and environmental factors with regard to foods recently. Accordingly, as both biological factors such as insects' own ecology, insects' behavioral distributions and the likes and social factors such as storage and distribution environments for food ingredients and finished food product have changed, there has been higher probability of introducing the insect-originated foreign materials into the foods during storing and distributing the foods after manufacturing the foods. Particularly, temperature and humidity changes owing to global warming have caused distribution and population density changes of insects sensitive to changes of external environmental conditions. Accordingly, the probability of generating contaminations caused by insects during manufacturing, storing and distributing the foods has been raised dramatically.

Total individual numbers of insects are determined by external environmental factors such as a temperature, a relative humidity and prey, population density of insects of the last generation in a previous year, and fatality rate in wintertime. As intense cold index in wintertime has been decreased and monthly average temperature changes has been less owing to global warming, the fatality rate of individual numbers of insects in wintertime been decreased rapidly. As the temperature and humidity conditions for insects to be able to develop in Korea has been expanded to wintertime, time of massive appearance of the first generation of harmful insects has been advanced. As the fatality rate has been decreased owing to high temperature in wintertime, it seems that much more insect individuals have been developed to imagoes at appearance period of the first generation of harmful insects. In addition, as the development period between harmful insects generation has been shorter, population density and kind of insects on the ecosystem for the foods have been raised, and therefore, claims with regard to claims introduced into the foods have been raised irrespective of season.

Moreover, as precipitation patterns in the Korean Peninsula have changed rapidly from a intense rainfall in summertime to a localized heavy rain throughout the year, the relative humidity having a large influence on the insect appearances has been kept high all the year around, and therefore, the population density of insects has been maintained very high all the year around. Besides, as the soil moisture contents have been raised, the amount of organic materials accumulated in soils has been raised and surface hardness has been lowered. As a result, an environment used as overwintering habitats for insects has been made under the deep grounds, and therefore, fatality rate of insects in wintertime has been inclined to reduce rapidly. Such changes in biological factors for insects has caused the appearance generations of insects population and total population density of insects throughout the year to be increased, and thereby increasing claims raised by consumers with regard to the insects found in the foods.

With regard to controlling harmful insects, U.S. Patent Publication No. 2013-0029976 discloses a pest controlling composition containing pyridalyl and indoxacarb. But, controlling efficiency may be decreased when controlling pests using the chemicals manufactured by a chemical synthetic process disclosed by the U.S. Patent publication because of pest resistances to the chemicals. In addition, with regard to an object of preventing insect from introducing into the foods can be digested by humans, the harmful chemicals may be kept resident in human body, and thereby having an adverse effect on the human body, and environmental contaminations may be caused by the chemicals that are diffused around ambient environment.

Accordingly, a physical control such as low-temperature storage and radiation treatment of the foods and biological control such as using natural enemies of pests have been proposed recently. However, the physical control is not maintained for a longtime, and, in particular, radiation treatment may have an adverse effect on the human body. While biological control is an environment-friendly measure, but it has shown lower short-term control effects. As such, biological control is not proper to store the foods for a short-term and there may remain insects in the foods after the biological control. Therefore, it has been required that process of controlling pests using material that is not harmful to a human body, environment-friendly, and has a good control effect against pests.

SUMMARY OF THE INVENTION

Accordingly, the present invention is directed to an adhesive that has anti-insect or mothproofing efficiencies. An advantage of one of more embodiments of the present invention is to provide an adhesive that has little side effects upon a human body and environment friendly anti-insect efficiency.

Another object of the present invention is to provide an adhesive that can prevent pests from entering into the foods during storing and/or distributing the foods.

Another object of the present invention is to provide an adhesive that can keep better physical properties such as adhesive force, viscosity and the likes as well as anti-insect efficiencies.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

In accordance with an embodiment of the present invention, as embodied and broadly described herein, the present invention provides an adhesive comprising an anti-insect ingredient comprising a plant extract, wherein the plant extract comprises an extract of Cinnamomum cassia, an extract of Syzygium aromaticum and an extract of Artemisia capillaris; and an adhesive ingredient comprising a binder.

In an exemplary embodiment, the extract of Cinnamomum cassia, the extract of Syzygium aromaticum and the extract of Artemisia capillaris may be mixed in the plant extract with a weight ratio of about 1 to about 10:about 1 to 1 bout 10:about 1 to about 10.

In particular, the extract of Cinnamomum cassia, the extract of Syzygium aromaticum and the extract of Artemisia capillaris may be mixed in the plant extract with a weight ratio of about 1 to about 5:about 1 to 1 bout 5:about 1 to about 5.

In an exemplary embodiment, the binder may be selected from the group consisting of a rubber-based resin, an acryl-based resin, a silicone-based resin, a urethane-based resin, an epoxy-based resin, a polyamide-based resin, an olefin-based resin, an ether-based resin and combination thereof.

In an embodiment, the binder may comprise a rubber-based resin that is selected from the group consisting of a reclaimed rubber-based resin, a butyl rubber-based resin, styrene-isobutylene-styrene block copolymer and combination thereof.

In another embodiment, the binder may comprise an acryl-based resin that comprises a solvent type, an emulsion type, a hot-melt type or a liquid phase curing type.

In still another embodiment, the binder may comprises an olefin-based resin that is selected from the group consisting of an isobutylene-maleic acid copolymer, an ethylene-vinyl acetate copolymer, (EVA), polypropylene, poly vinyl chloride (PVC), a copolymer thereof and combination thereof.

In further another embodiment, the binder may comprise an ether-based resin that comprises ether-based cellulose.

In particular, the binder may comprise oriented polypropylene (OPP).

The adhesive may further comprise a functional additive such as a chain extender, a curing agent, a tackifier, a plasticizer, an oxidant, a filler and combination thereof.

In another exemplary embodiment, the adhesive ingredient may further comprise a solvent.

The solvent may be selected from the group consisting of water, an organic solvent and combination thereof.

In an exemplary embodiment, the organic solvent may be selected from the group consisting of a hydrocarbon-based solvent, a halogenated hydrocarbon-based solvent, an alcohol-based solvent, an aldehyde-based solvent, an ether-based solvent, an ester-based solvent, a ketone-based solvent, a glycol-ether-based solvent and combination thereof.

In an exemplary embodiment, the adhesive may comprise about 0.1% to about 10% by weight of the anti-insect ingredient and about 90% to about 99.9% by weight of the adhesive ingredient.

In particular, the adhesive may comprise about % to about 5% by weight of the anti-insect ingredient and about 95% to about 99% by weight of the adhesive ingredient.

In another embodiment, the adhesive may be formulated as an adhesive tape.

In particular, the adhesive may comprise a hot-melt type adhesive.

In accordance with another aspect of the present invention, there is provided a process for controlling a pest, the process comprising applying the adhesive that comprises the anti-insect ingredient and the adhesive ingredient.

In one embodiment, applying the adhesive may comprise applying an anti-insect adhesive.

In another embodiment, applying the adhesive may comprise applying the adhesive to a package box, for example, to a food package box.

In one alternative embodiment, applying the adhesive may comprise applying the adhesive to an inside of the food package box.

In another alternative embodiment, applying the adhesive may comprise applying the adhesive to an inside of a corrugated cardboard of the food package box.

In an exemplary embodiment, the adhesive is applied for controlling Lepidoptera insect.

In particular, the adhesive may be applied for controlling Plodia interpunctella.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

In FIG. 5, treatment means an average value of the numbers of Indianmeal Moth found in the package boxes treated with the OPP tape that contains 1% and 3% by weights of anti-insect ingredient;

In FIG. 6B, treatment means an average value of the distributions of Indianmeal Moth found in the package boxes applied by the OPP tape that contains 1% and 3% by weights of anti-insect ingredient;

In FIG. 7, treatment means an average value of the numbers of Indianmeal Moth found in the package boxes treated with the OPP tape that contains 1% and 3% by weights of anti-insect ingredient;

In FIG. 8B, treatment means an average value of the distributions of Indianmeal Moth found in the package boxes applied by the OPP tape that contains 1% and 3% by weights of anti-insect ingredient;

In FIG. 10A, each of letters 'a' 'b' and 'c' indicates a significance differences between the untreatment group and the treatment group in accordance with statistical analysis;

In FIG. 10B, each of letters 'a' 'b' and 'c' indicates a significance differences between the untreatment group and the treatment group in accordance with statistical analysis;

DETAILED DESCRIPTION OF THE ILLUSTRATED EMBODIMENTS

Figure 1:
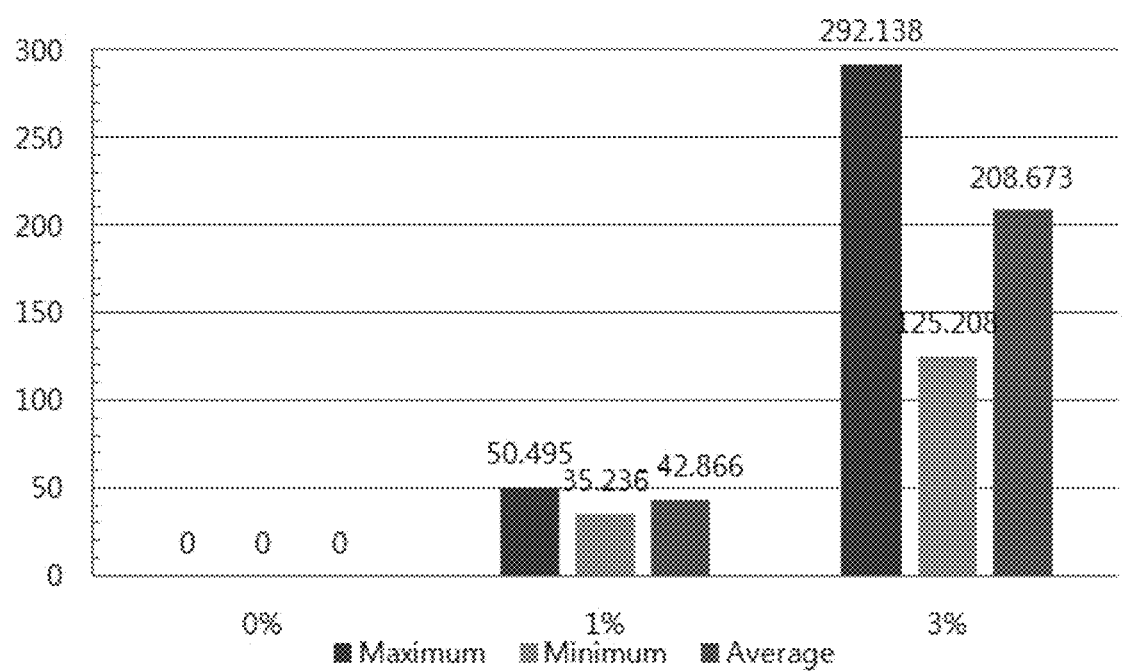
FIG. 1 is a graph showing maximum, minimum and average values of results of measuring contents of second metabolite, cinnamaldehyde released from OPP tapes applied to a box package with gas chromatography in accordance with exemplary examples of the present invention and a comparative example.
Figure 2:
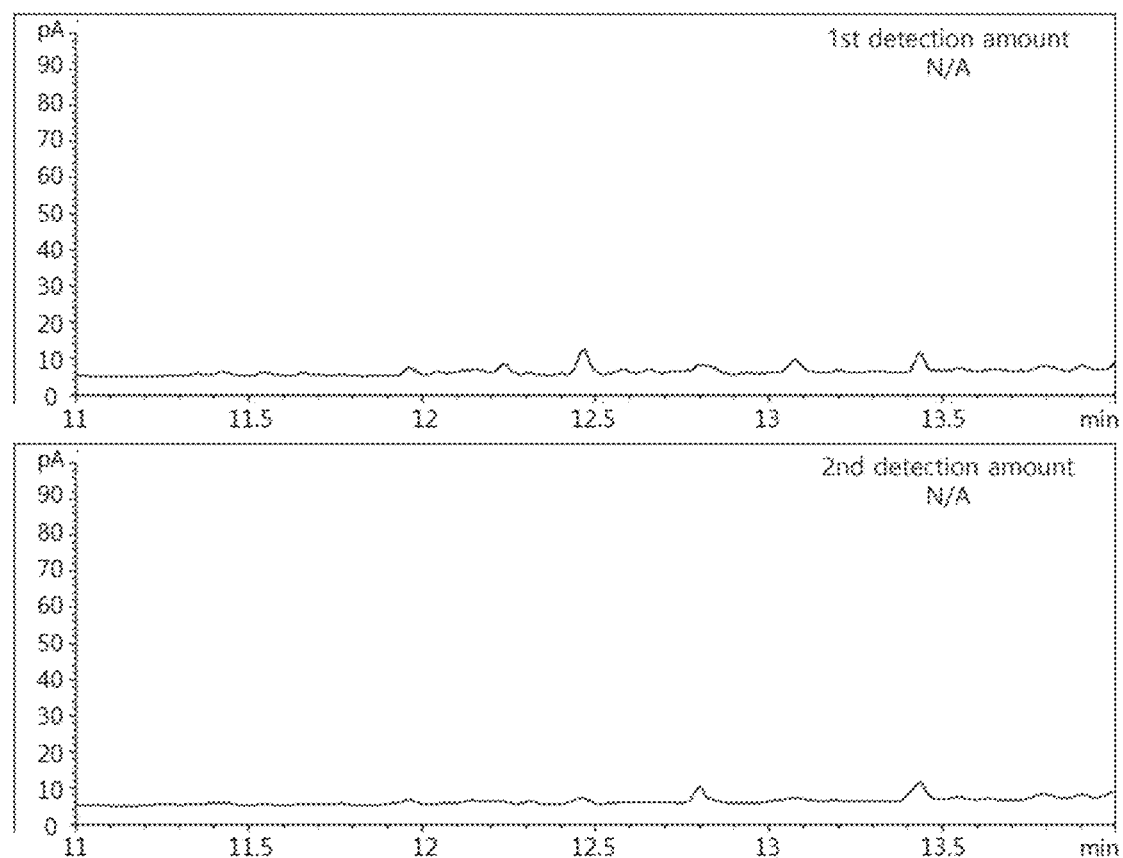
FIG. 2 is a graph showing a result of measuring contents of second metabolite, cinnamaldehyde released from an OPP tape, applied to a box package, that does not contain any anti-insect ingredient with gas chromatography in accordance with a comparative example.
Figure 3:
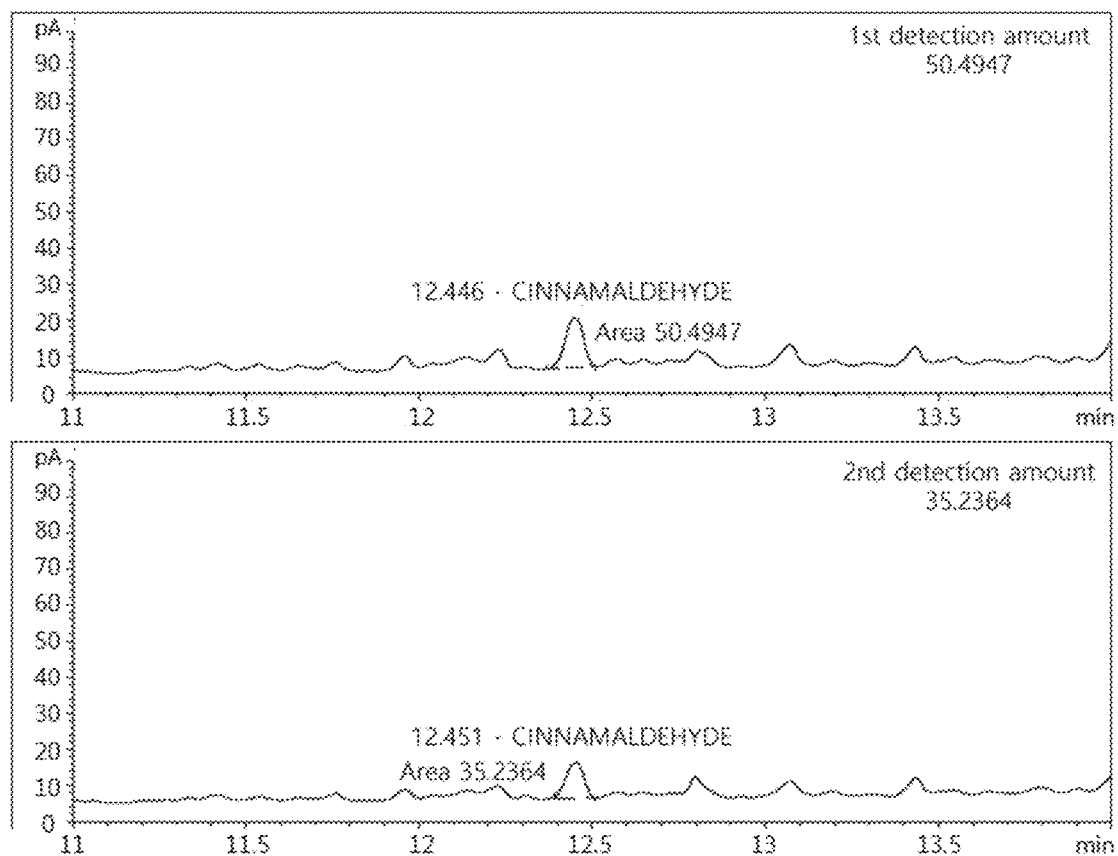
FIG. 3 is a graph showing results of measuring contents of second metabolite, cinnamaldehyde released from an OPP tape, applied to a box package that contains 1% by weight of an anti-insect ingredient with gas chromatography in accordance with an exemplary example of the present invention.
Figure 4:
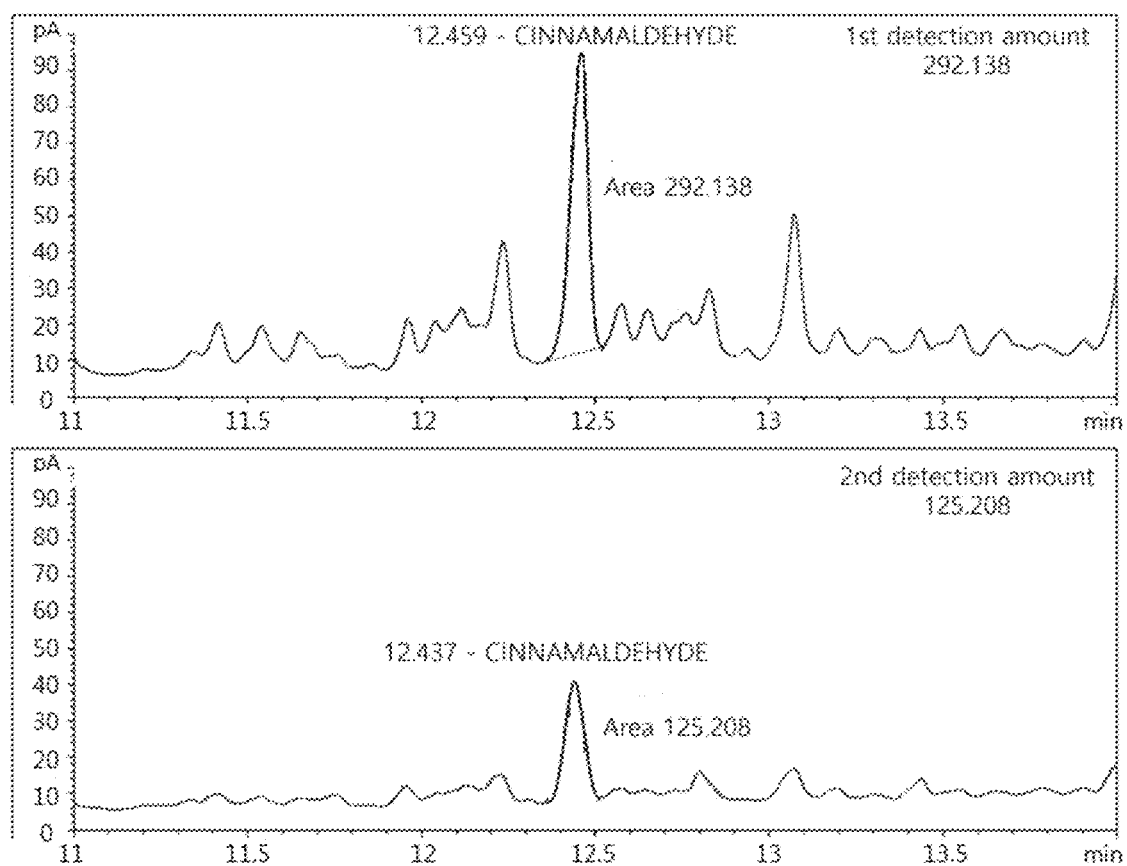
FIG. 4 is a graph showing a result of measuring contents of second metabolite, cinnamaldehyde released from an OPP tape, applied to a box package, that contains 3% by weight of an anti-insect ingredient with gas chromatography in accordance with another exemplary example of the present invention.

Advantages and features of the present invention and methods of accomplishing the same may be understood more readily by reference to the following detailed description of exemplary embodiments. However, the present invention will be embodied in many different forms and is not limited to the embodiments set forth herein. Rather, these embodiments are provided to complete the disclosure of the present invention and to completely convey the concept of the invention to one of skill in the art, and the present invention will be defined only by a category of claims.

Shapes, sizes, rates, angles, numbers, etc. as disclosed in the drawings for explaining the embodiments of the present invention are illustrative and are not limited to the details shown. The same reference numerals throughout the specification refer to the same elements. Additionally, in the following description of the present invention, a detailed description of the well-known technique that is determined to unnecessarily obscure the subject matter of the present invention will be omitted.

In cases that "include", "have", "comprise", etc. are mentioned on this specification, other parts may be added unless "only" is used together. The term of the component used in the singular without specific mention includes plural ones.

Interpretation of the component includes a margin of error even if there is no clear description.

When the description of the positional relationship between two parts includes 'on', 'over', 'under', 'beside', etc., one or more parts may be positioned between the two parts unless "right" or "direct" is used.

When the description of the time sequential relation includes 'after', 'followed by', 'next', 'before', etc., non-continuous cases may be included unless right" or "direct" is used.

The first, second, etc. may be used to describe these various components, but these components are not limited by these terms. These terms are only used to distinguish one element to the other components. Thus, the first component referred to below may be a second component within the scope of the present invention.

Characteristics of the various embodiments of the present invention may be partially or fully coupled to or combined with each other and may be technically variously linked and driven, and each of the embodiments may be performed independently with respect to each other and be carried together in relation with each other.

As used herein, the term "adhesive" means any materials can be changed from liquid state to solid state in case of being exposed to external environment. The 'adhesive' includes both a chemical adhesive having a strong adhesive force in case changing from a liquid state to a solid state and a chemical tackifier that can be removed easily. Accordingly, as used herein, the term "adhesion" means both a chemical adhesion that contacts at lower pressure and forms a bonding force at once and a chemical bonding that two solid faces intervened with the adhesive are bonded to each other.

As used herein, the term "part(s) by weigh" means a relative weigh ratio among the admixed ingredients, unless mentioned otherwise. Also, as used herein, the term "(meth) acrylate" includes both "acrylate" and "methacrylate", unless mentioned otherwise.

Hereinafter, embodiments of the present invention will be described in detail with reference to accompanying drawings.

The adhesive with anti-insect efficiency of the present invention comprise an anti-insect ingredient comprising a plant extract which comprises an extract of *Cinnamomum cassia*, an extract of *Syzygium aromaticum* and an extract of *Artemisia capillaris*; and an adhesive ingredient comprising a binder, and optionally a solvent.

[Anti-Insect Ingredient]

The extract of *Cinnamomum cassia* as an anti-insect ingredient may be obtained from a cinnamon. Cinnamon as one raw material of the plant extract as an anti-insect ingredient is a complete bark or a part of bark removing a little of a periderm of *Cinnamomum cassia* Blume and the likes belonged to Lauraceae. It has been known that cinnamon has physiological efficiencies of promoting a blood circulation, increasing appetite, preventing spastic pain in stomach, and the likes. The extract of *Syzygium aromaticum* as an anti-insect ingredient may be derived from clove buds. The clove buds as another raw material of an anti-insect ingredient is a flower bud of *Syzygium aromaticum* belonged to Myrtaceae. It has been known that the clove buds has physiological efficiencies of relieving stomachache, indigestions, gingivitis and the likes, anti-inflammations, anti-oxidations, lowering blood pressure and the likes. In addition, the extract of *Artemisia capillaris* consisting of the anti-insect ingredient may be derived from dried young stems and/or leaves of *Artemisia capillaris* of Compositae. In accordance with Korean traditional medicines, the young stems and/or leaves of *Artemisia capillaris* have physiological efficiencies of lowering fever, promoting dieresis and the likes.

The mixed plant extract of the anti-insect ingredient of the adhesive may be obtained any process of obtaining natural plant materials. For example, the mixed plant extract of *C. cassia, S. aromaticum* and *A. capillaris* may be obtained using an extract solvent. The extract solvent comprises, but are not limited to, an organic solvent such as a polar solvent (for example, $C_1$-$C_5$ alcohol such as about 50% to about 100% methanol, ethanol (spirit), ethylacetate and the likes) or a non-polar solvent such as hexane, chloroform or dichloromethane, water and mixed solvent thereof.

Generally, the extract solvent comprises about 50% to about 100%, preferably about 80% to about 100% $C_1$-$C_5$ alcohol, water and mixed solvent thereof. For example, in case of using alcohol or alcohol-water mixed solvent as the extract solvent, the plant extract having an anti-insect or mothproofing efficiency may be obtained at a temperature lower than thermal water extraction, for example, at an extraction temperature from about 30° C. to about 37° C., preferably from about 40° C. to about 60° C. In case of using the mixed solvent of alcohol and water, alcohol and water may be admixed with a weight ratio of about 9:1 to about 5:5, preferably about 8:2 to about 6:4.

Extraction process may be done once or may be repeated several times, and a common extractor, an ultra-sonic grinding apparatus, a fraction apparatus may be used during extracting. If necessary, the obtained extracting liquid may be filtered and concentrated under reduced pressure. The extraction process may be performed using the dried and ground *C. cassia, S. aromaticum* and *A. capillaris* as an anti-insect ingredient with removing salts and impurities, and the obtained extract may be stored at a deep freezer until using. In addition, the mixed extract of *C. cassia, S. aromaticum* and *A. capillaris* may be an extract without any moisture by concentrating and freeze-drying the obtained extract using the extract solvent. Such a mixed extract without any moisture may be used as a powder form, or solution form that dissolves the powder into water or a common solvent.

If necessary, a fraction process may be performed with the mixed extract of *C. cassia, S. aromaticum* and *A. capillaris* obtained using the extract solvent, using a fraction solvent. The fraction solvent may comprise, but are not limited to, hexane, methylene chloride, acetone, ethylacetate, ethylether, chloroform, water and/or combination thereof.

The mixed extract of *C. cassia, S. aromaticum* and *A. capillaris* using the extract solvent, or the fraction obtained by the fraction process may be further concentrated and/or dried to remove the solvents. Filtering may be performed with a proper filter paper or a vacuum filter, the concentration process may be performed with a vacuum evaporator, for example, a rotary evaporator, and the drying may be performed with freezing drying.

In one exemplary embodiment, the extract of *C. cassia*, the extract of *S. aromaticum* and the extract of *A. capillaris* an anti-insect ingredient may be mixed with a weight ratio of about 1 to 10:about 1 to 10:about 1 to 10, preferably, about 1 to 5:about 1 to 5:about 1:5. In case of using the mixed plant extract of *C. cassia, S. aromaticum* and *A. capillaris*, there happens a synergy effect and the mixed plant extract may lead to much higher anti-insect efficiency against a pest compared to using only one plant extract.

The anti-insect ingredient may be contained, but are not limited to, about 0.1% to about 10% by weigh, preferably about 0.1% to about 5% by weight, more preferably about 0.1% to about 3% by weight, and most preferably about 1% to about 3% by weight in the adhesive of the present invention. For example, in case the adhesive is formulated as an adhesive tape, the anti-insect ingredient of the mixed plant extracts may be contained, but are not limited to, about 0.1% to about 10% by weight, preferably about 0.1% to about 3% by weight, more preferably about 1% to about 3% by weight in the adhesive. Alternatively, in case the adhesive is a hot-melt type, the anti-insect ingredient may be contained, but are not limited to, about 0.1% to about 3% by weight, preferably about 0.1% to about 1% by weight in the adhesive. If the contents of the anti-insect ingredient in the adhesive are less than the above ranges, the adhesive may not exhibit an anti-insect activity. On the contrary, if the content of the anti-insect ingredient in the adhesive are more than the above ranges, the physical properties of the adhesive such as adhesive property and/or viscosity may be lowered.

[Adhesive Ingredient]

The adhesive ingredient may comprise a binder that has an adhesive property, and optionally a solvent and a functional additive.

The binder may comprise any binder materials having adhesive property. For Example, the binder may be selected from, but are not limited to, the group consisting of a rubber-based resin, an acryl-based resin, a silicone-based resin, a urethane-based resin, an epoxy-based resin, a polyamide-based resin, an olefin-based resin, an ether-based resin and combination thereof. The binder, or monomer(s) and/or oligomer(s) for synthesizing the binder, may be added in the range of about 30 to about 100 parts by weight, preferably about 30 to about 90 parts by weight, more preferably about 30 to about 70 parts by weight in the adhesive ingredient.

The rubber-based resin may be selected from, but are not limited to, consisting of a reclaimed rubber-based resin such as reclaimed natural rubber and/or reclaimed butyl rubber, butyl rubber-based resin such as polyisobutylene (PIB) and/or a polyisobutylene-isobutylene copolymer, a styrene-isobutylene-styrene block copolymer and combination thereof.

The acryl-based resin may be obtained by polymerizing reactions among acryl-based monomer(s) and/or acryl-based oligomer(s). The monomer or the oligomer for synthesizing the acryl-based resin may comprise, but are not limited to, acrylic ester such as $C_1$~$C_9$ alkyl substituted acrylic ester and/or methacrylic ester such as $C_{10}$~$C_{12}$ alkyl substituted methacrylic ester. The monomer or the oligomer for synthesizing the acryl-based resin may comprise, but are not limited to, ethyl acrylate (EA), butyl acrylate (BA) and/or 2-ethylhexyl acrylate (2-EHA) as an adhesive monomer; vinyl acetate (VAc), acrylonitrile (AN), styrene (St), methyl acrylate (MA) and/or methyl methacrylate (MMA) ac as a co-monomer of cohesive ingredient; a functionalized monomer such as acrylic acid, methacrylic acid, 2-hydroxylethyl (meth) acrylate, dimethylaminoethyl (meth) acrylate, acrylamide glycidyl (meth) acrylate as a reaction point for promoting adhesion force and/or in case of using a cross-linker and the likes.

In case of using the acryl-based resin as the binder, the acryl-based resin may comprises, but are not limited to, a solvent-type, an emulsion-type, a hot-melt type or a liquid phase curing type. A cross-linker or a curing agent such as a melamine resin, a urea resin, an epoxy resin, polyisocyanate, metal chelate(s), UV curing agent and/or combination thereof.

As the silicon-based resin, a linear silicone polymer, which has a general formula $[(R)_2SiO]_n$, wherein R is $C_1$~$C_{10}$ alkyl group such as methyl group or phenyl group, the alkyl group and phenyl group may substituted with methyl group and/or vinyl group at terminal, and has hundreds of thousand weight average molecular weight; and/or MQ resin, which comprises M unit of a general formula $[(CH_3)_3SiO_{1/2}]$ and Q unit of a general formula $[SiO_{4/2}]$, as a tackifier, may be used mainly.

The silicone-based resin may comprise blend of such materials and a condensation polymer between a hydroxyl group on the terminal of the silicone polymer and another hydroxyl group on the terminal of the silicone resins. In this case, the silicone-based resin may comprise a dilution solvent, a catalyst, and optionally a cross-linker in case the silicone-based resin is an additive adhesive. It is possible to generate various adhesive/bonding forces by changing the relative ratio between the silicone polymer and the silicone resin. For example, in case of using the silicone-based resin or binder, the additive may be classified into a peroxide curable silicone-based resin/binder, an additive silicone-based resin/binder and the likes as per the reaction mechanisms.

The urethane-based resin may be synthesized through a reaction between isocyanate and polyol. Isocyanate may comprise, but are not limited to, toluene diisocyanate (TDI), diphenylene diisocyanate (MDI), hexamethylene diisocyanate (HDI) and/or isophorone diisocyanate (IDPI). Polyol may comprise, but are not limited to, polyether-based polyol or polyester-based polyol. For example, polyether-based polyol and/or polyester-based polyol may be obtained by co-polymerization of ethylene oxide, propylene oxide and the likes. If necessary, a chain extender such as an amine-based compound and/or polyhydric alcohols, and/or a curing agent such as a diisocyanate-based compound, an aziridine-based compound and an epoxy-based resin may be added in the urethane-based resin.

The olefin-based resin may be selected from, but are not limited to, the group consisting of a co-polymer of isobutylene-maleic acid, a copolymer of ethylene vinyl acetate (EVA), polypropylene such as oriented polypropylene (OPP), polyvinyl chloride (PVC), a co-polymers thereof, and blends thereof.

The ether-based resin uses ether-based cellulose derivatives as a main component. For example, the ether-based resin may comprise, but are not limited to, methyl cellulose (MC), carboxyl methyl cellulose (CMC) and a copolymer thereof.

The epoxy-based resin may be classified into a glycidyl ether type, a glycidyl ester type, a glycidyl amine type, a linear aliphatic type, a cyclo-aliphatic type, and an aromatic type by its chemical structures. The epoxy-based resin may comprise, but are not limited to, a bisphenol A-based epoxy resin, a bisphenol F-based epoxy resin, a novolac-based epoxy resin, an aliphatic-based epoxy resin, a amine-based epoxy resin and the likes.

For example, each of the bisphenol A-based epoxy resin such as bisphenol A glycidyl ether or the bisphenol F-based epoxy resin may be obtained respectively by reacting bisphenol A or bisphenol F or derivatives thereof with epichlorohydrin. On the contrary, the novolac-based epoxy resin such as epoxyphenol novolac (EPN) or epoxycresol novolac (ECN) may be obtained by reacting phenol, cresol or derivatives thereof with formaldehyde and inducing glycidylation with epichlorohydrin.

The aliphatic-based epoxy resin may comprise, but are not limited to, a glycidyl epoxy resin and a cyclo-aliphatic epoxy resin. The glycidyl epoxy resin may be obtained by reacting epichlorohydrin with aromatic alcohols or aliphatic carboxylic acids in the presence of alkali such as sodium hydroxide to synthesize glycidyl ethers, or by reacting epichlorohydrin with aliphatic carboxylic acid to synthesize glycidyl esters. The glycidyl epoxy resin may comprise, but are not limited to, dodecanol glycidyl ether, glycidyl esters of hexahydrophthalic acid, trimethylopropane triglycidyl ether and the likes.

For example, the cyclo-aliphatic-based epoxy resin may be synthesized by reacting peracid such as peracetic acid with cyclo-olefins. Generally, the cyclo-aliphatic-based epoxy resin has oxirane ring(s) fused with cyclo-aliphatic ring in a cyclo-aliphatic epoxy structure.

The cyclo-aliphatic-based epoxy resin may be preferable because toxic chemicals such as epichlorohydrin are not used in synthesizing the cyclo-aliphatic-based epoxy resin. The cyclo-aliphatic epoxy resin may comprise, but are not limited to, 3,4-epoxycyclohexylmethyl-3,4-epoxycyclohexane carboxylate and the likes.

The amine-based epoxy resin such as glycidyl substituted amine-based epoxy resin contains multiple epoxy functional groups, and may be obtained by reacting aromatic amines with epichlorohydrin. The amine-based epoxy resin may comprise, but are not limited to, triglycidyl-p-aminophenol, tetraglycidyl diamine diphenyl methane (TGDDM), N,N,N,N-tetraglycidyl-4,4-methylene bisbenzylamine, and the likes.

If necessary, the adhesive ingredient may comprise a solvent such as water (for example, distilled water and/or deionized water) and/or an organic solvent. The organic solvent may comprise, but are not limited to, a hydrocarbon-based organic solvent, a halogenized hydrocarbon-based organic solvent, an alcohol-based organic solvent, an aldehyde-based organic solvent, an ether-based organic solvent, en ester-based organic solvent, a ketone-based organic solvent, a glycol ether-based organic solvent, and other organic solvents.

The exemplary hydrocarbon-based organic solvent may be selected from, but are not limited to, the group consisting of aliphatic hydrocarbons such as gasoline, kerosene, hexane and the likes; cyclo-aliphatic (alicyclic) hydrocarbons such as cyclohexanol, methyl cyclohexanol and the likes; aromatic hydrocarbons such as benzene, toluene, xylene and the likes; and combination thereof.

The exemplary halogenized hydrocarbon-based organic solvent may be selected from, but are not limited to, the group consisting of aliphatic chlorinated hydrocarbons such as dichloromethane, chloroform, dichloroethane, trichloroethane, tetrachloroethane, dichloro ethylene, trichloro ethylene, tetrachloro ethylene and the likes; aromatic chlorinated hydrocarbons such as chlorobenzene, dichlorobenzene and the likes; and combination thereof.

The exemplary alcohol-based organic solvent may be selected from, but are not limited to, the group consisting of 1-butanol, 2-butanol, isobutyl alcohol, isopentyl alcohol, isopropyl alcohol and combination thereof. The exemplary ether-based organic resin may be selected from, but are not limited to, the group consisting of ethyl ether, dioxane, tetrahydrobutane and combination thereof. The exemplary ester-based organic solvent may be selected from but are not limited to, the group consisting of methyl acetate, ethyl acetate, propyl acetate, isopropyl acetate, butyl acetate, isobutyl acetate, pentyl acetate, isopentyl acetate and combination thereof.

In addition, the exemplary ketone-based organic solvent may be selected from, but are not limited to, the group consisting of acetone, methyl ethyl ketone (MEK), methyl butyl ketone (MBK), methyl isobutyl ketone (MIBK) and combination thereof. The exemplary glycol ether(cellosolve)-based organic solvent may be selected from, but are not limited to, the group consisting of ethylene glycol monomethyl ether, ethylene glycol monoethyl ether, ethylene glycol monoethyl ether acetyl, ethylene glycol monobutyl ether and combination thereof. Besides, other organic solvent such as hydrocarbon disulfide and cresol may be used. While the contents of the solvent are not particular ranges, preferably, the solvent may be contained about 40% to about 70% by weight in the adhesive ingredient.

In addition, the adhesive ingredient may further comprise at least one functional additive. The exemplary functional additive may comprise, but are not limited to, a tackifier, a plasticizer or softener, an antioxidant, a filler and combination thereof. The exemplary tackifier may comprises, but are not limited to, a rosin-based or rosin-derived tackifier, a terpene-based tackifier, a styrene-based tackifier, a petroleum-based tackifier, a xylene-based tackifier, a phenol-based tackifier and/or a coumarone-indene-based tackifier. The exemplary plasticizer or softener may comprise, but are not limited to, liquid polybutene, naphthen-based oil, process oil, liquid polyisobutylene, dioctyl phthalate (DOP), dibutyl phthalate (DBP) and the likes. The exemplary antioxidant may comprise, but are not limited to, aromatic amine derivatives, phenol derivatives, organic salts of thioacid and the likes. The exemplary filler may comprise, but are not limited to, ZnO, $TiO_2$, calcium carbonate, clay, a pigment, carbon and the likes.

While the contents of the functional additive may be varied as per usages, but each of the functional additive may be contained in the range of about 0.1% to about 10% by weight, preferably about 0.1% to about 5% by weight in the additive ingredient.

The adhesive ingredient may be contained, but are not limited to, in the range of about 90% to about 99.9% by weight, preferably about 95% to about 99.9% by weight, more preferably about 97% to about 99.9% by weight, and most preferably about 97% to about 99% by weight in the adhesive of the present invention. For example, in case the adhesive is formulated as an adhesive tape, the adhesive ingredient may be contained, but are not limited to, in the range of about 90% to about 99.9% by weight, preferably about 97% to about 99.9% by weight, more preferably about 97% to about 99% by weight in the adhesive. Alternatively, in case the adhesive is a hot-melt type, the adhesive ingredient may be contained, but are not limited to, in the range of about 97% to about 99.9% by weight, preferably about 99% to about 99.9% by weight in the adhesive. If the contents of the adhesive ingredient are within the above-mentioned ranges, the physical properties such as adhesive property and/or viscosity of the adhesive may not be lowered, and the adhesive can exhibit excellent anti-insect efficiency.

[Adhesive]

The adhesive of present invention may comprise, but are not limited to, a water-soluble dispersed liquid type, an organic soluble type that forms a film with solvent evaporating, a two-component type, a hot-melt type of thermal plastic resins that can be dissolved into free-flowing solvents and be applied to adherents, or a pressure-sensitive adhesive (PSA) type such as an adhesive tape type.

For example, the adhesive comprises a non-reaction type adhesive without accompanying chemical reactions and a reaction type adhesive. The non-reaction type adhesive may be classified into a solventless adhesive, an adhesive that evaporates solvents before bonding, an adhesive that evaporates solvents in bonding and a water-soluble emulsion type of polymer binders.

The exemplary solventless adhesive may comprise, but are not limited to, a hot-melt type adhesive, which is a liquid state in heating to dip the adherent and then can be changed into a solid state after cooling to bond to the adherent, and a plastisol adhesive which contains fine-powdered PVC dispersed in a plasticizer and adhesive promoting agents such as an epoxy resin, polyethylene glycol dimethyl acrylate, phenol resins.

The exemplary adhesive that evaporates solvents before bonding may comprise, but are not limited to, a heat sealing adhesive, which makes sealing among films, as a solvent or an emulsion type, a contact adhesive which is applied to a surface of the adherent and then can be bonded to the adherent by applying pressures to the surface after evaporating solvents completely, a PSA type which is bonded to the adherent by applying pressures to the surface of the adherent without solvents and/or dispersing agents.

The exemplary adhesive that evaporates solvents in bonding may comprise, but are not limited to, a solution type that contains polymeric materials and resins dissolved in organic solvents such as an adhesion adhesive that makes a bonding while the solvents dissolves and swells the surface of the adherent and a solvent adhesive, and a water-soluble adhesive solution type such as a water-soluble starch-dextran-based adhesive and a cellulose ether-carboxyl methyl cellulose-based adhesive.

The exemplary water-soluble emulsion type of polymeric binders may comprise, but are not limited to, an emulsion type adhesive containing dispersion of water-soluble synthetic resins and a latex type adhesive containing rubber latex and the likes.

On the contrary, the reaction type adhesive is an adhesive containing low-molecular monomers and/or oligomers before adhesion. The exemplary reaction type adhesive may comprise, but are not limited to, a general polymerization adhesive such as a polymerization adhesive, for example, a polyester-based adhesive of a styrene solution and a (meth) acrylate solution, a non-admixing adhesive that contains a resin and a primer; a addition polymerization adhesive such as an epoxy resin adhesive and/or a polyurethane adhesive; and a condensation polymerization adhesive such as a silicone-based adhesive and an adhesive using co-polymer of polyamide-polyimidazole resins.

Except of the plant extracts as the anti-insect ingredient, it is possible to use commercially available materials as the adhesive including the adhesive ingredient. For example, Henkel Korea has sold hot-melt type adhesives that contain binder materials of ethylene vinyl acetate (EVA), methallocene poly alpha olefins (PAO), polyolefin containing atactic PAO, block copolymer, a hot-melt of polyurethane, and polyamide in the name of TECHHNOMELT™. More concretely, an additive comprising, but are not limited to, TECHNOMETL™ Exp. 0314 (Henkel Korea), which presumably contains 30% to 50% by weight of the copolymer and 5% to 10% by weight of a synthetic wax, and/or TECHNOMETL™ TK-333P (Henkel Korea), which presumably contains 20% to 30% by weight of the synthetic wax and 5% to 10% by weight of the copolymer, can be used as a hot-melt type adhesive.

In one embodiment, the additive of the present invention may be applied to a package box, more concretely, an inside of the package box and/or an inside of corrugated fiber board of the package box for distributing and/or storing foods. In accordance with one exemplary embodiment, the adhesive of the present invention has an excellent anti-insect efficiency against pest such as Indianmeal Moth (*Plodia interpunctella*).

Insect pests of stored product belonged to Lepidoptera such as an Indianmeal Moth, which is selected as a subject pest in the examples of the present invention, (*Nyctegretis triangulella*) and almond moth (*Cadra cautella*) exhibits enormous adaptability to various environmental conditions. Since the insect pests of stored product belong to Lepidoptera ingest feeds only in the larval stage, they can explore feeds and move easily. In addition, because the insect pests of stored product belonged to Lepidoptera have strong perforation ability, it is highly likely that they invade into foods in order to explore feeds during distributing and storing foods.

Besides, because the insect pests of stored product in Lepidoptera pass the wintertime as a late stage larva or pupa, they exhibit an extremely high cold resistance, and they show behavioral properties of exploring and moving toward dark hideouts that provides a physical protection in order to maintain pupation. Accordingly, the insect pests of stored product in Lepidoptera moves toward an inside or a chink of corrugated card board in a package box which is generally used in distributing and/or storing foods, and therefore, it is highly probable that consumers find survival-state larvae or pupae of the insect pests of stored product in Lepidoptera when consumers intends to use or ingest foods stored in the package box. Such survival-state insect pests of stored product found in the foods or the package box may lead to enormous economic losses such as sales declines and reputation decreases of companies manufacturing the foods.

In particular, one imago of Indianmeal Moth can spawn about 200 eggs and its emergence ratio is about 0.3 (30%). Also, as the first generation of Indianmeal moth is emerged in wintertime as the global warming, the total generation numbers appeared on the whole year are increased from three generations to five generations, and the last population numbers of Indianmeal Moth on September/October are increased extremely. In particular, as food companies has purchased and processed food materials massively in foreign producing area recently in order to reduce production cost, the time for storing and transporting foods has been increased. Besides, as storages at warehouse store and parcel services of on-line transaction to local finished foods has been increased, there has been provided much hideouts, for example, an inside of corrugated cardboard of food storage boxes that is dark and provides physical protections with the insect pests of stored product, in particular the larvae of the insect pests exhibiting excellent environmental adaptability such as cold resistance and perforation ability.

In accordance with an exemplary example of the present invention, an adhesive using a secondary metabolite derived from the above plant extracts is adopted. Such an adhesive does not cause any environmental problems resulted from increased thickness of food packages and/or reinforcing package materials and enables us not to use agricultural pesticides and/or chemical pharmaceuticals that have adverse effects upon animals such as a human or livestock. In addition, it is possible to effectively control the insect pests of stored product invade into the inside of the box package during distributing and storing the foods without any side effects of increasing production cost, and thereby minimizing direct and indirect losses of the food companies and consumers owing to the insect pests of stored product.

Hereinafter, the present invention will be described in more detail in the examples. But, the present invention is not intended to the disclosure in the examples below.

[Materials]

The Indianmeal Moths in the examples were lines breed in successive generation at Population Ecology Lab of Korea University. We used Indianmeal Moth larvae of 3~4 ages of the week prior to pupa stage prefer dark places such as cracks of corrugated cardboard that provides physical protection in order to pupation.

Example 1: Evaluation of Physical Property of Anti-Insect OPP Tape for Adhering Food Package Box According to Addition of Anti-Insect Ingredient

*Cinnamon cassia*, *Syzygium aromaticum*, and *Artemisia capillaris* registered in Korean Food Code were admixed with a predetermined weight ratio (1~5:1~5:1~5), and mixed plants were extracted at 40° C. using distilled water and ethanol (3:7) as extraction solvents, and then mixed plant extraction liquid having concentrations of 20~30 Brix including secondary metabolite (semiochemical) produced in the co-evolution of plants and insects. Each of 1% by weight, 3% by weight and 5% by weight of the extraction liquid was respectively mixed with solid contents (21% by weight of petroleum derived hydrocarbon resin, 60% by weight of polypropylene, and 19% by weight of natural rubber) of OPP tape for packaging box so that anti-insect OPP tapes that applied by 100 g/m² of adhesives (25% of solid contents, 75% of toluene as a solvent; 27.5 g of solid contents, 0.275 g (1% by weight) of the mixed plant extract, 0.825 g (3% by weight) of the mixed plant extract and 1.375 g (5% by weight) of the mixed plant extract including an extract of *C. cassia*, an extract of *S. aromaticum* and *A. capillaris*) were fabricated.

We examined the contents ratio of the anti-insect ingredient that does not show any changes of physical property (product thickness, adhesion force, initial adhesion force, tensile strength and elongation percentage) compared to a physical property of the conventional OPP tape that does not contain any anti-insect ingredient based upon KS T 1028 Test Standard in order to evaluate the physical property of the OPP tapes as the addition of the anti-insect ingredient. Also, we measured the changes of adhesion force as the elapsed times. The thickness of the product (tape) was measured using 1/1000 dial thickness gauge. The adhesion force was measured by attaching the tapes with a predetermined dimensions (25 mm×150 mm) to SUS 304 and by splitting the tapes from SUS 304 at 180' (UTM), the initial adhesion force was measured by attaching the tapes with the same dimensions to SUS and by splitting the tapes from SUS 304 at 30' and then by rolling the ball on a beat board. The adhesion forces were measured after applying the adhesives and then placing them at room temperature for 1 hour. Table 1 below indicates results of measuring changes of physical properties of anti-insect OPP tapes fabricated according to the present invention and of the conventional OPP tape based upon KS T 1028 Standard.

TABLE 1

Physical Properties Changes of Anti-insect OPP Tape and Conventional OPP Tape

|  | Conventional (Standard) | 1% addition | 3% addition | 5% addition |
| --- | --- | --- | --- | --- |
| Product thickness (um) | 65 ± 3 | 64 | 65 | 65 |
| Film thickness (um) | 40 ± 2 | 40 | 40 | 40 |
| Adhesion force (gf/25 mm) | >700 | 795 | 813 | 834 |
| Initial adhesion force (Ball no.) | >5 | 8 | 8 | 8 |
| Tensile strength (kgf/10 mm) | >4.0 | 4.1 | 4.1 | 4.1 |
| Elongation percentage (%) | >110 | 145 | 141 | 138 |
| Adhesive type | Solvent based rubber | Solvent based rubber | Solvent based rubber | Solvent based rubber |

As indicated in Table 1, it was measured that the initial changes of physical properties of OPP tapes each of which is treated respectively by 1%, 3% and 5% by weight of the anti-insect ingredient is matched to the standard values, and the anti-insect ingredient showed an excellent compatibility with the conventional adhesive.

However, the adhesion force is the most important function in an OPP tape. Although the initial adhesion force is excellent, when other materials are included in the conventional adhesive, the adhesion forces may be declined as elapsed times. Accordingly, there is high probability of destroying the product owing to the decline of adhesion force in case of applying the adhesive including other materials to a box package. As such, we also measured the change of adhesion force as elapsed time of the OPP tapes each of which was treated by 1%, 3% and 5% by weight of the anti-insect ingredient. The measurement results are indicated at Table 2 below.

As indicated Table 2, it was measured that the change of the adhesion force as elapsed time of the OPP tapes which was treated by 1%, 3% and 5% by weight of the anti-insect ingredient was maintained more than a standard value (700 gf/25 mm). In particular, there were no substantial changes of the adhesion force as elapsed time in case of the OPP tapes treated by 1% and 3% by weight of the anti-insect ingredient.

TABLE 2

Adhesion Force as Elapsed Time of Anti-insect OPP Tape

| Time (hr) | 1% addition | 3% addition | 5% addition |
| --- | --- | --- | --- |
| 1 | 795 | 813 | 834 |
| 24 | 801 | 818 | 827 |
| 48 | 811 | 821 | 811 |
| 72 | 805 | 808 | 795 |
| 96 | 793 | 805 | 765 |
| 120 | 813 | 822 | 770 |
| 144 | 807 | 804 | 756 |
| 168 | 815 | 807 | 731 |

Example 2: Measurement of Secondary Metabolite in OPP Tape

We measured the contents of secondary metabolite (detective compound: cinnamaldehyde) contained in the OPP tapes each of which contains, respectively, 1% by weight and 3% by weigh of the anti-insect ingredient using gas chromatography (GC) based upon the results in Example 1. The detective compound cinnamaldehyde as the secondary metabolite is an insect pest repellent and is synthesized in plants for protecting plants from insect's invasions. Because the applying amount of the adhesive containing the anti-insect ingredient on the manufacture OPP tapes may be inconsistent, we repeated GC analysis and calculated a maximum value (area), a minimum value (area) and an average (mean) value (area). The measurement results are shown in FIGS. 1-4. As shown in FIGS. 1-4, it was measured that each the OPP tape without the anti-insect ingredient, the OPP tape having 1% by weight of the anti-insect ingredient and the OPP tape having 3% by weight of the anti-insect ingredient contained 0, 42.8668 (Area) and 208.67385 (Area) of the second metabolite cinnamaldehyde, respectively.

Example 3: Applying the Adhesive to Food-Filled Package Box

Box package products (31.5×38×26 cm) filled with instant noodles (Ansungtangmyun™, Nongshim, Republic of Korea) were placed into experimental vessels (52×70.5×43.5 cm), a control group, a box package without applying any OPP tape, and two experiment groups, each of which is a box package applying respectively the OPP tape containing 1% by weight and 3% by weight of the anti-insect ingredient to top and bottom cracks of each of the box package to seal the box package, were introduced into the vessels. And then, 200 larvae of Indianmeal Moth, 3~4 ages of the week, were introduced into each of the box packages, and each of the box package was stored for three weeks at the temperature ranges of 25~28° C. and at the relative humidity of 60%. After then, we measured the numbers of pupae and exuviae of Indianmeal Moth found in an inside of the box, an inside of corrugated cardboard of the box and an inside of the product. Also, we analyzed a pest-invasion control effect in the anti-insect OPP tapes through a statistical analysis, SAS T-TEST, based upon the numbers of pupae and exuviae of Indianmeal Moth found in the inside of the box, the inside of corrugated cardboard of the box and the inside of the product. Besides, we analyzed a pest distribution as per a box package location of the control group and the experimental group using ANOVA statistical analysis to evaluate if the OPP tapes treated with the anti-insect ingredient have an effect upon an invasion route of the pest infiltrating into the box and upon the location distribution of the pest after invasion.

Figure 5:
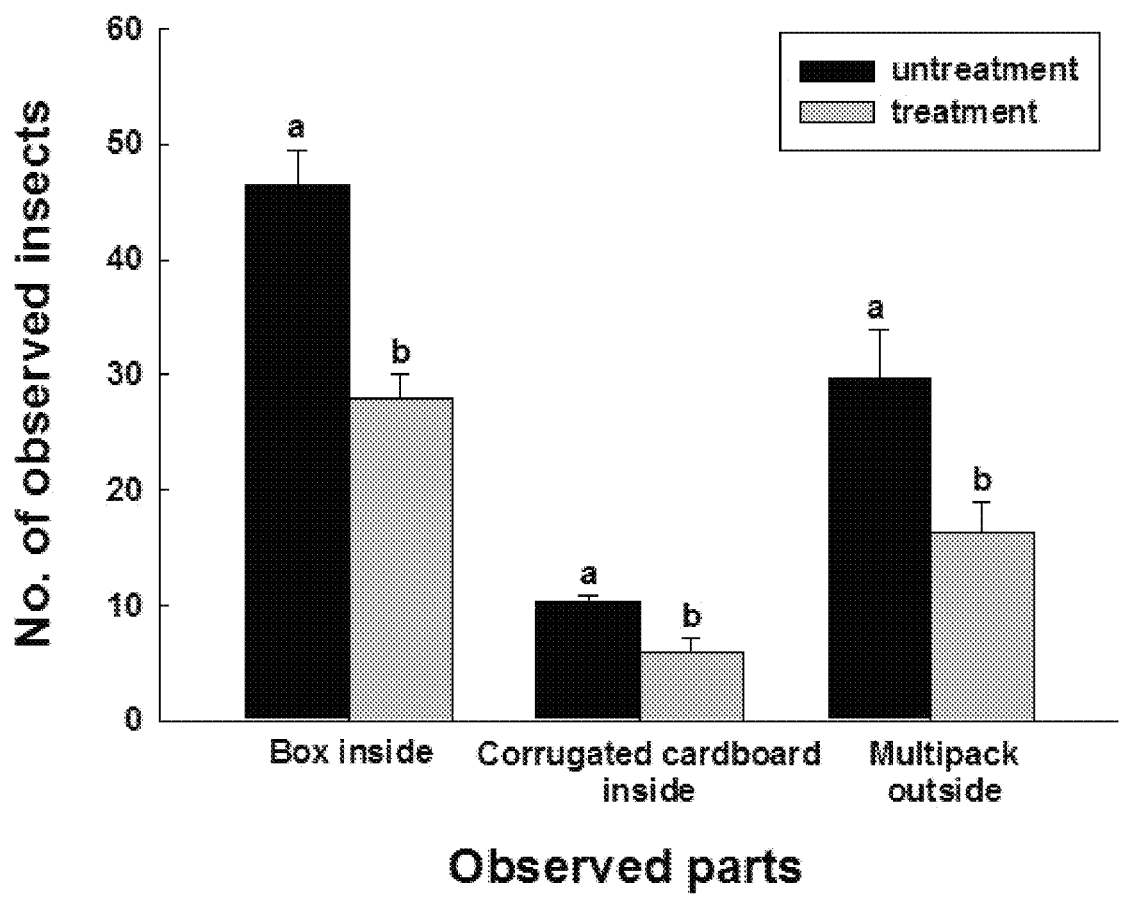
FIG. 5 is a graph showing a result of measuring the numbers of pupae and exuviae of Indianmeal Moth founded in various box positions, after applying the OPP tape treated with an anti-insect ingredient to a food-filled package boxes in accordance with an exemplary example of the present invention.

FIG. 5 is a graph showing a result of measuring the numbers of pupae and exuviae of Indianmeal Moth founded in various box positions, after applying the OPP tape treated with an anti-insect ingredient to the food-filled package boxes in accordance with the example. As shown in FIG. 5, it was measured that each of the total individual numbers of the Indianmeal Moth found in each of the inside cracks of the corrugated cardboard of the box package, the inside of the product (outside of multipack) and inside of the box package is 6±2.16, 16.25±5.32, and 28±5.59, respectively. On the contrary, it was measured that each of the total individual numbers of the Indianmeal Moth found in each of the inside cracks of the corrugated cardboard of the box package, the inside of the product (outside of multipack) and inside of the box package is 10.25±1.26, 29.75±8.26 and 46.5±8.23, respectively (cracks of corrugated cardboard box: df=6, t=3.40, P-value=0.0145; Inside of the product: df=6, t=2.75, P-value=0.0334; inside of the box package: df=6, t=4, P-value=0.0053). Accordingly, we certified that the total individual numbers of the pest found in the box applied by the anti-insect OPP tape were significantly decreased compared to the total individual numbers of the pest found in the box without applying the anti-insect OPP tape. In other words, the OPP tape containing the anti-insect ingredient was shown to control or suppress the Indianmeal Moth larvae' invasion into the inside of the box package.

Figure 6A:
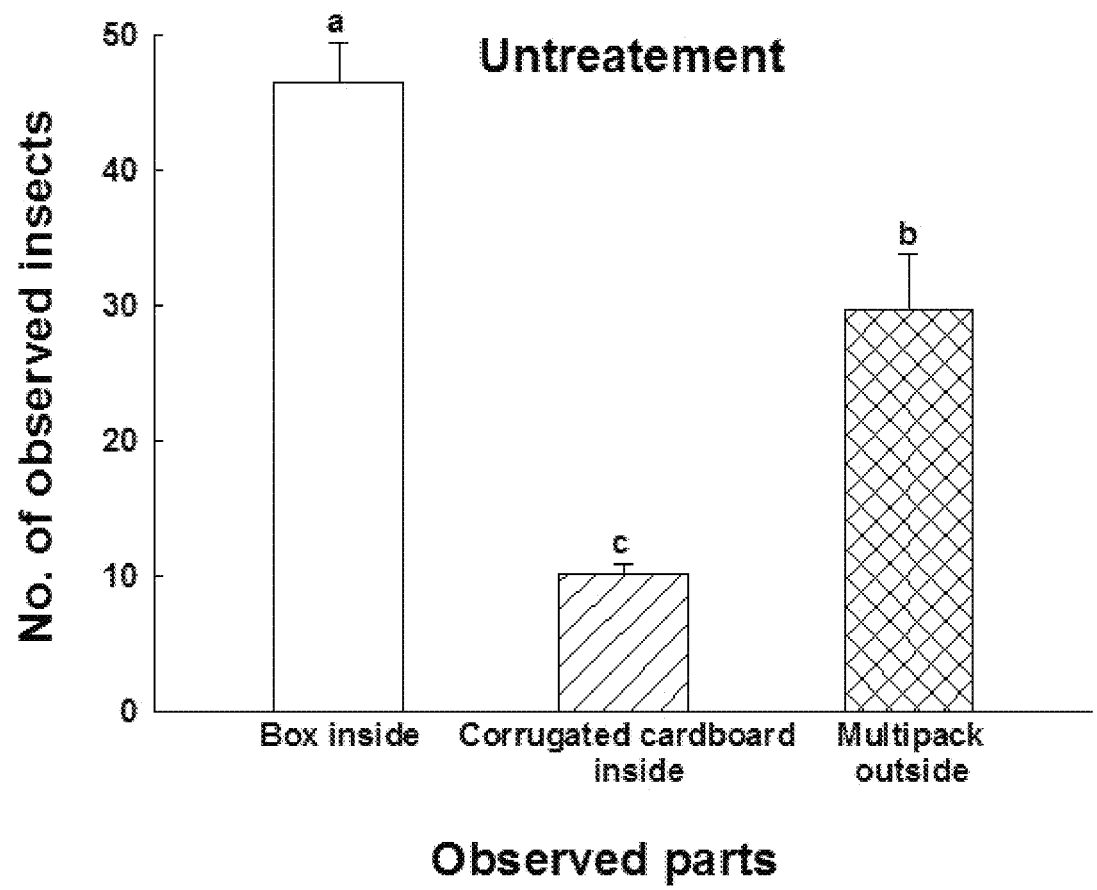
FIG. 6A is a graph showing a result of measuring distributions of pupae and exuviae of Indianmeal Moth founded in various box positions, after applying the OPP tape that does not treat with any anti-insect ingredient to the food-filled package boxes in accordance with another comparative example.
Figure 6B:
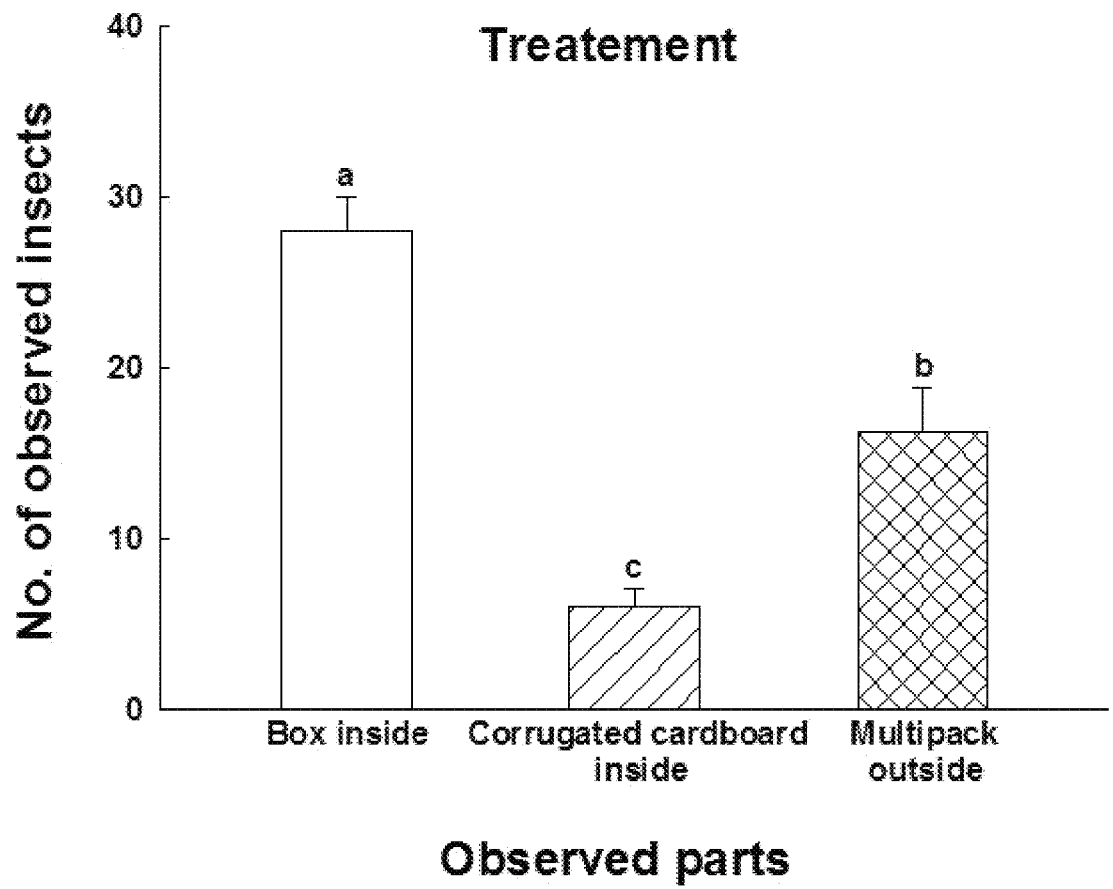
FIG. 6B is a graph showing a result of measuring distributions of pupae and exuviae of Indianmeal Moth founded in various box positions, after applying the OPP tape that treats with anti-insect ingredients to the food-filled package boxes in accordance with another example of the present invention.

FIG. 6A is a graph showing a result of measuring distributions of pupae and exuviae of Indianmeal Moth founded in various box positions, and FIG. 6B is a graph showing a result of measuring distributions of pupae and exuviae of Indianmeal Moth founded in various box positions, after applying the OPP tape that treats with anti-insect ingredients to the food-filled package box. As shown in FIGS. 6A and 6B, it was measured that there existed much insect pest individuals in the inside of the box compared to the inside of the corrugated cardboard in both the control group (Untreatment) and the experimental group (Treatment). In case of the food-filled box, a folded portion in individual product package or a space among the food products provides enough hideouts preferred by the larvae of Indianmeal Moth. Therefore, it was evaluated that there existed much insect pest individuals in the folded portion in individual product package compared to the inside cracks of the corrugated cardboard in the 95% statistical level of significance (control group: df=2.9, F=28.74, P-value<0.0001; experimental group: df=2.9, F=22.63, P-value=0.0003).

Example 4: Applying the Adhesive to Food-Unfilled Package Box

We repeated the procedures in Example 3, except using a food-unfilled box (control group) and the OPP tapes, each of which contains respectively 1% by weight and 3% by weight of the anti-insect ingredient, was applied to another food-unfilled box instead of the food-filled box.

Figure 7:
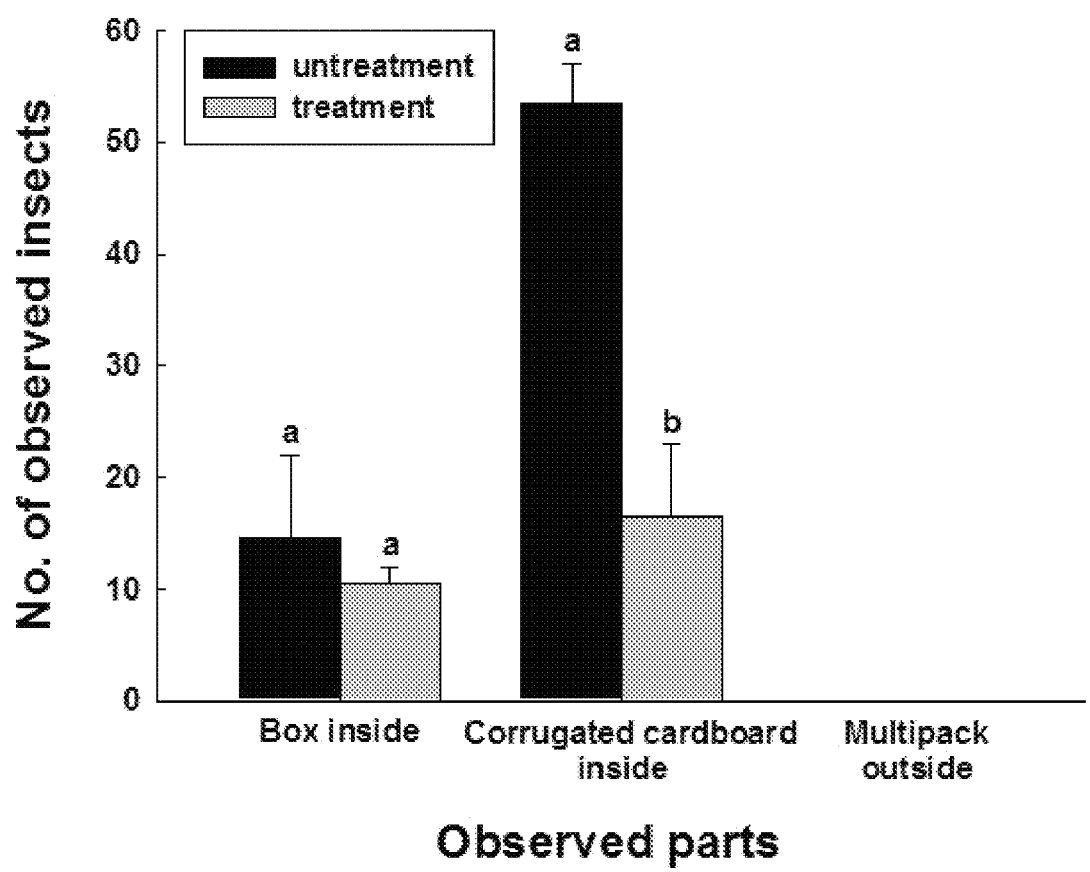
FIG. 7 is a graph showing a result of measuring the numbers of pupae and exuviae of Indianmeal Moth founded in various box positions, after applying the OPP tape treated with an anti-insect ingredient to a food-unfilled package boxes in accordance with an exemplary example of the present invention.

FIG. 7 is a graph showing a result of measuring the numbers of pupae and exuviae of Indianmeal Moth founded in various box positions, after applying the OPP tape treated with an anti-insect ingredient to the food-unfilled package boxes in accordance with the example. As shown in FIG. 7, since the food was not placed into the box and therefore, the hideouts for the Indianmeal moth larvae were decreased, there were no statistically significant differences between the individual numbers (10.5±2.12) in the experimental group (Treatment) and the individual numbers (14.5±10.61) in the control group (Untreatment) found inside of the box (df=2, t=0.52, P-value=0.6532). On the contrary, there were statistically significant differences between the individual numbers (16.5±9.19) in the experiment group and the individual numbers (53.5±9.19) in the control group found inside of the corrugated cardboard of the box in 95% level of significance (df=2, t=5.01, P-value=0.0376). Accordingly, we also certified that the OPP tape containing the anti-insect ingredient controls the Indianmeal Moth larvae' invasion into the inside of the box package effectively.

Figure 8A:
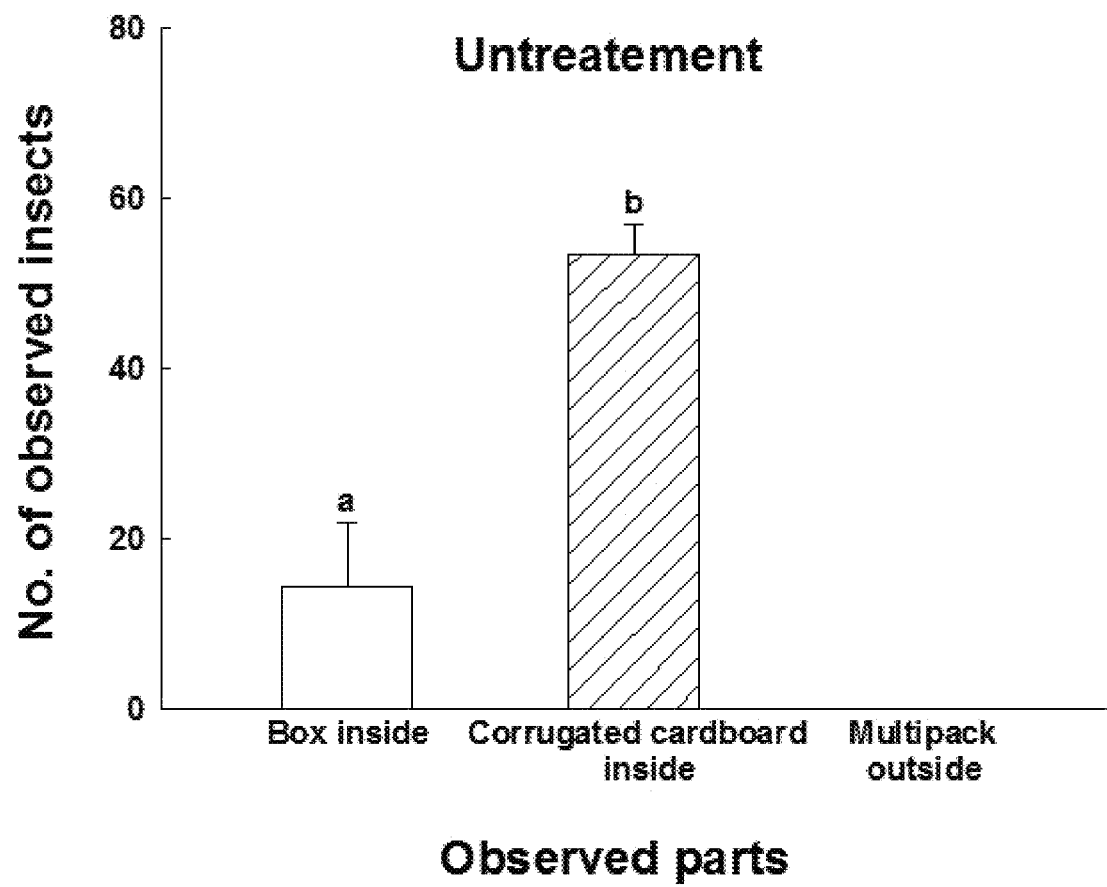
FIG. 8A is a graph showing a result of measuring distributions of pupae and exuviae of Indianmeal Moth founded in various box positions, after applying the OPP tape that does not treat with any anti-insect ingredient to the food-unfilled package boxes in accordance with another comparative example.
Figure 8B:
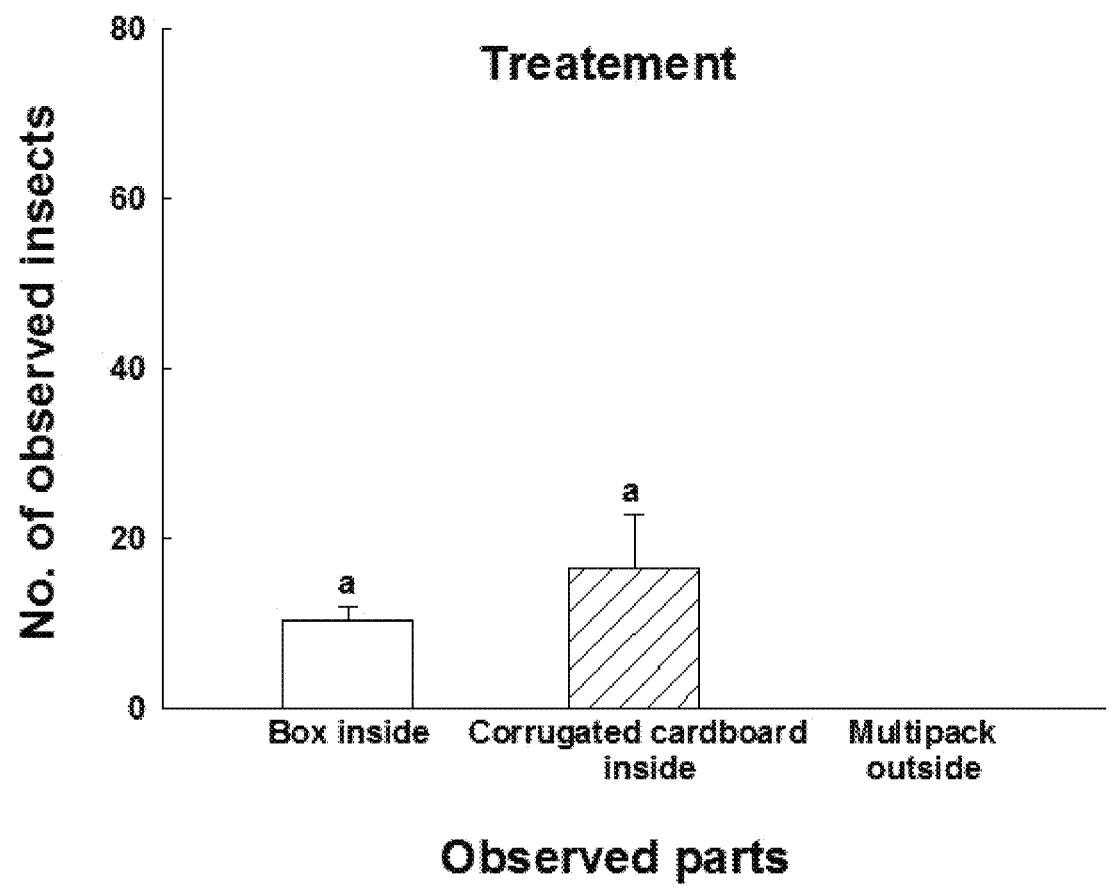
FIG. 8B is a graph showing a result of measuring distributions of pupae and exuviae of Indianmeal Moth founded in various box positions, after applying the OPP tape that treats with anti-insect ingredients to the food-unfilled package boxes in accordance with another example of the present invention.
Figure 9A:
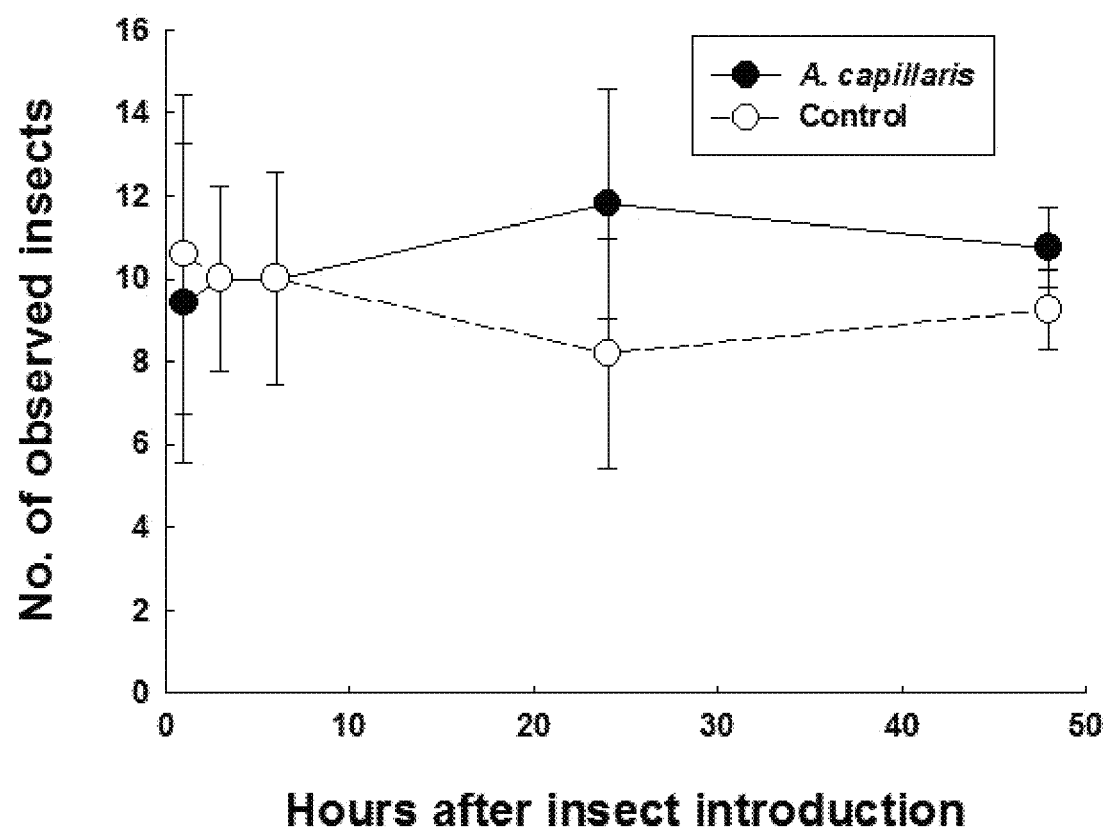
FIG. 9A is a graph showing a result of measuring a repellent efficiency against a pest using only an extract of *Artemisia capillaris* in accordance with a comparative example.
Figure 9B:
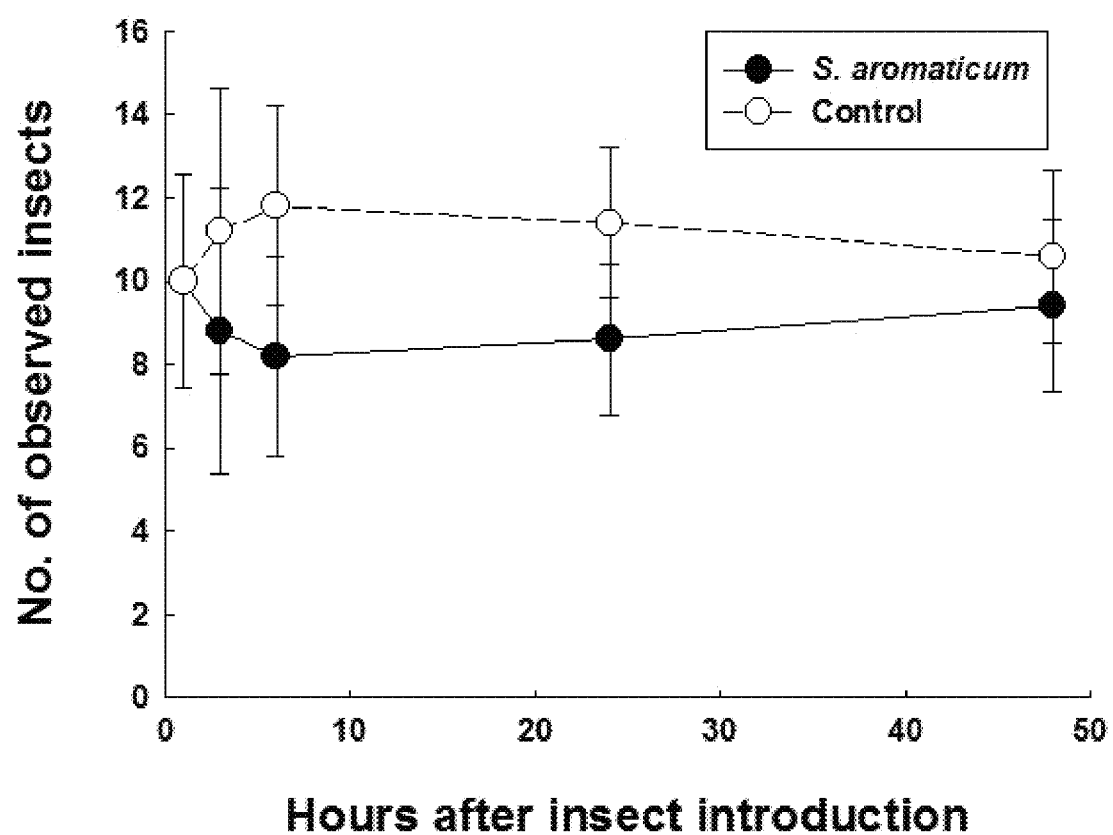
FIG. 9B is a graph showing a result of measuring a repellent efficiency against a pest using only an extract of *Syzygium aromaticum* in accordance with a comparative example.
Figure 9C:
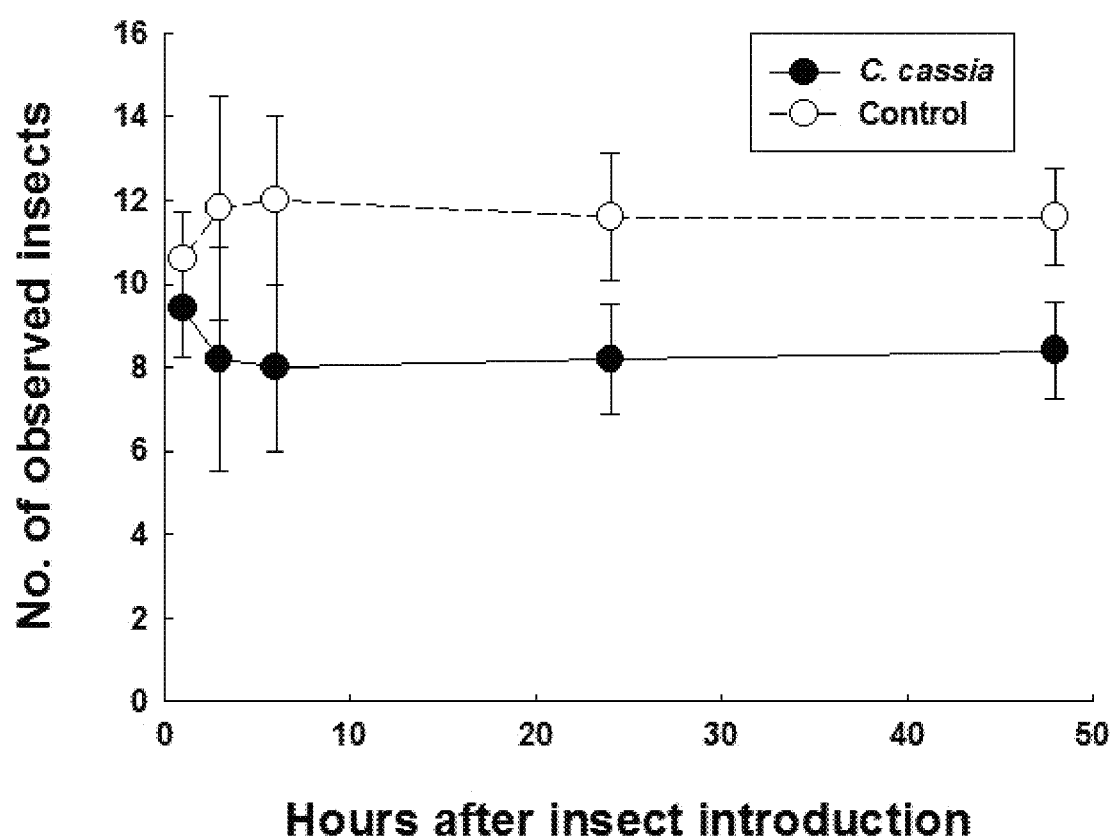
FIG. 9C is a graph showing a result of measuring a repellent efficiency against a pest using only an extract of *Cinnamomum cassias* in accordance with a comparative example.
Figure 9D:
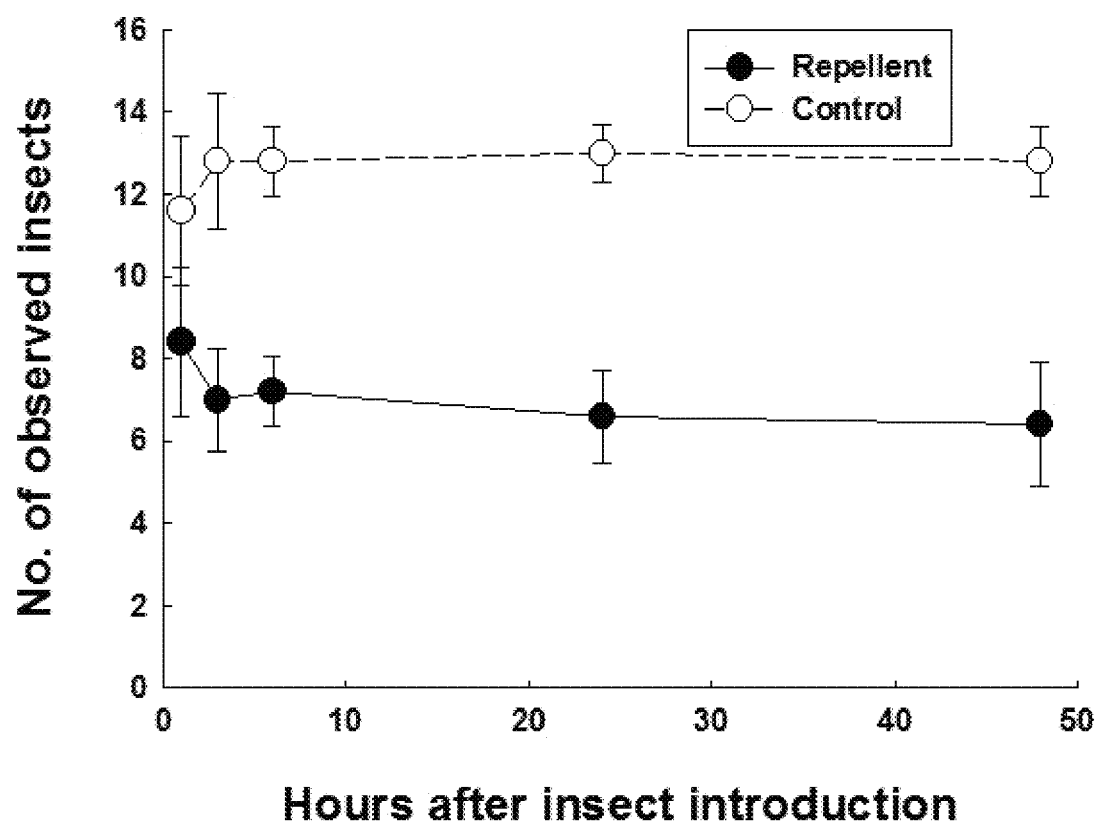
FIG. 9D is a graph showing a result of measuring a repellent efficiency against a pest using a mixed plant extract of an extract of *Artemisia capillaris*, an extract of *Syzygium aromaticum* and an extract of *Cinnamomum cassias* in accordance with another example of the present invention, In FIG. 9D, Repellant means that the mixed plant extract was used in the experiment.
Figure 10A:
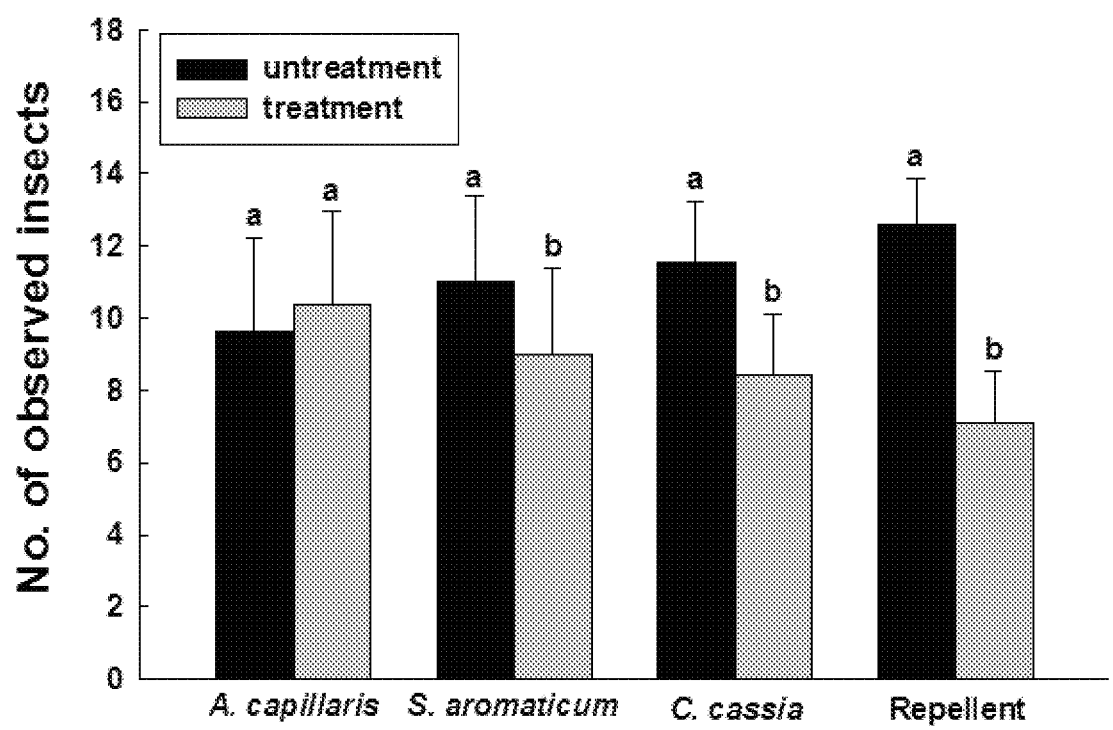
FIG. 10A is a graph showing a result of measuring the numbers of the observed individual pests in case using only one plant extract of *Artemisia capillaris*, *Syzygium aromaticum* or an extract of *Cinnamomum cassias* (untreatment) in accordance with another comparative examples and using the mixed plant extract (Repellent) in accordance with another examples of the present invention.
Figure 10B:
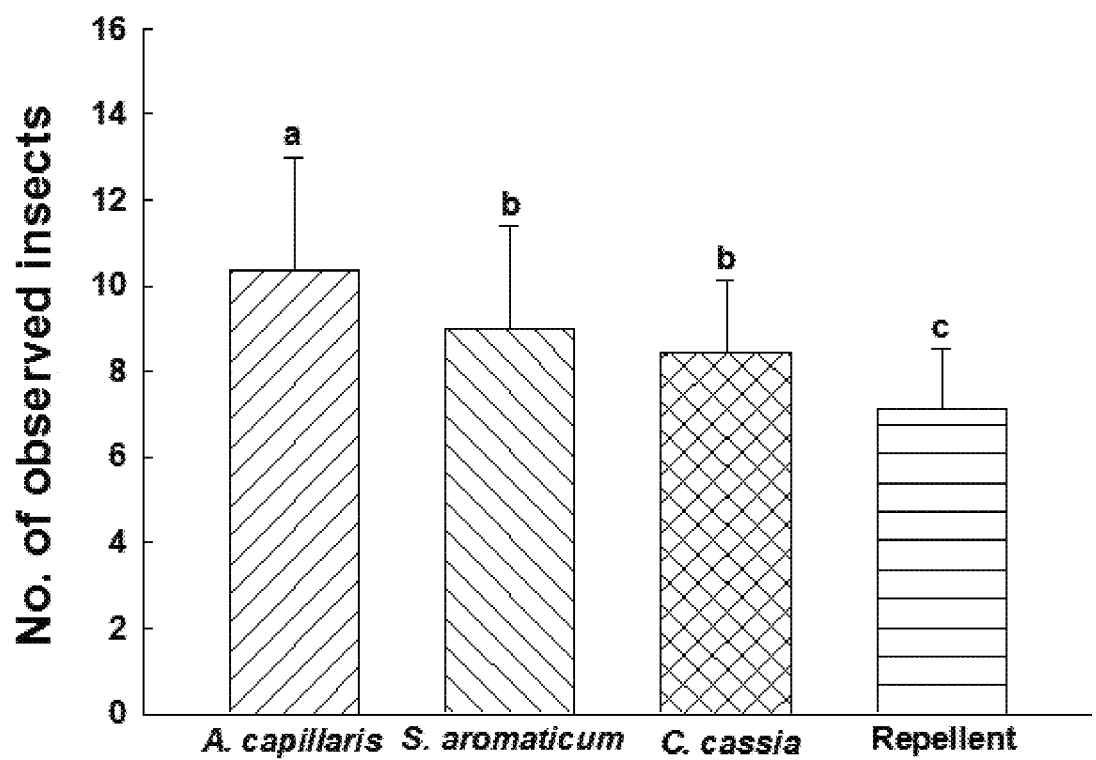
FIG. 10B is a graph showing an average value of the individual numbers of the Indianmeal Moth among the control group (*A. capillaris, S. aromaticum* and *C. cassia*) and treatment group (Repellent) during the whole treatment time a in accordance with analysis of variance (ANOVA).

FIG. 8A is a graph showing a result of measuring distributions of pupae and exuviae of Indianmeal Moth founded in various box positions, and FIG. 8B is a graph showing a result of measuring distributions of pupae and exuviae of Indianmeal Moth founded in various box positions, after applying the OPP tape that treats with anti-insect ingredients to the food-unfilled package box. As shown in FIGS. 8A and 8B, it was measured that there existed much insect pest individuals in the inside of the corrugated cardboard compared to the inside of the box in both the control group (Untreatment) and the experimental group (Treatment). In case of the control group, the individual numbers of the Indianmeal Moth found in the inside of the box were 14.5±10.61 and the individual numbers of the Indianmeal Moth found in the inside of the corrugated cardboard were 53.5±9.19. It was measured that there existed much Indianmeal Moth individuals in the inside of the corrugated cardboard, which is a better hideouts for the larvae of Indianmeal Moth and matched to ecological and behavioral properties of the larvae of Indianmeal Moth, compared to the inside of the box in 95% statistical level of significance (df=2.5, F=23.32, P-value=0.0149). On the contrary, in case of the experimental group, the individual numbers of the Indianmeal Moth found in the inside of the box were 10.5±2.12 and the individual numbers of the Indianmeal Moth found in the inside of the corrugated cardboard. In other words, there were no statistically significant differences between the individual numbers the larvae of Indianmeal Moth found in the inside of the box and the individual numbers of the larvae of Indianmeal Moth found in the inside of the corrugated cardboard in the experimental group in 95% statistical level of significance (df=2.5, F=4.70, P-value=0.01189). Accordingly, it was analyzed that the OPP tape containing the anti-insect ingredient can control the larvae' invasion into the inside of the box remarkably.

Example 5: Anti-Insect Efficiency as Per Mixing of Plant Extract

In this example, we measured the repellent efficiency against pest as per the admixing of the plant extracts. A filter paper with diameter of 10 cm was half-cut, and an extract of *A. capillaris*, an extract of *S. aromaticum*, an extract of *C. cassia*, and a mixed extract of three plants (Repellent) were dipped over the filter paper, and then dried for 24 hours. And then, we measured repellent efficiencies each of the extracts against larvae of Indianmeal Moth. The measurement results are shown in FIGS. 9A to 9D and FIGS. 10A to 10D. As shown in these figures, there were synergistic repellent efficiencies as using the mixed extract of three plants.

Example 6: Changes of Physical Properties as Addition of Hot-Melt Type Adhesive Containing Anti-Insect Ingredient In this example, we measured the changes of physical properties as adding the extract of *A. capillaris*, the extract of *S. aromaticum* and the extract of *C. cassia* to hot-melt type adhesives for packaging box. 90% of a functional additive, Pripol 1013 was mixed with 10% of the anti-insect ingredient comprising mixed extract of three plants (*A. capillaris, S. aromaticum, C. cassia*) in order to fabricate a mixing solution as pest repellent. And then, the mixing solution (1% by weight or 2% by weight) was added into a hot-melt type adhesive TECH (Henkel Korea) having excellent compatibility to evaluate the physical properties. After melting the adhesive, the mixing solution as the pest repellent was added into the adhesive, and then stirred 1 hour. Table 3 indicates the measurement results for the physical properties of the adhesive.

TABLE 3

Physical Property of Hot-melt Type Adhesive as Addition of Pest Repellent Mixed Solution

| Test | | 0% | 1% | 2% | Note |
|---|---|---|---|---|---|
| Viscosity (cps) | 160° C. | 1,602 | 1,425 | 1,465 | Brookfield viscometer RVDVII (SP#37) |
| | 170° C. | 1,227 | 1,115 | 1,133 | |
| | 180° C. | 955 | 870 | 923 | |
| Softening point (° C.) | | 119 | 108 | 119 | Ring &Ball method |
| Gardener color | | 4~5 | 5 | 6~7 | Gardener color comparator |
| Heat Resistance | SAFT* (° C.) | 80 | 80 | 80 | Henkel Method Corrugated box using 1 kg pendulum |
| Creep resistance (° C.) | | 50~55 | 45~50 | 45~50 | Henkel Method Hard board using 200 g pendulum |
| Open time (sec) | | 10~12 | 12~13 | 12~13 | KANEBO |
| Compression time Partial tearing (50%) Complete tearing (100%) | | 0.5/1 | 0.5/1 | 0.5/1 | Hot melt tester |

*Shear adhesion failure temperature

Figures 11A, 11B:
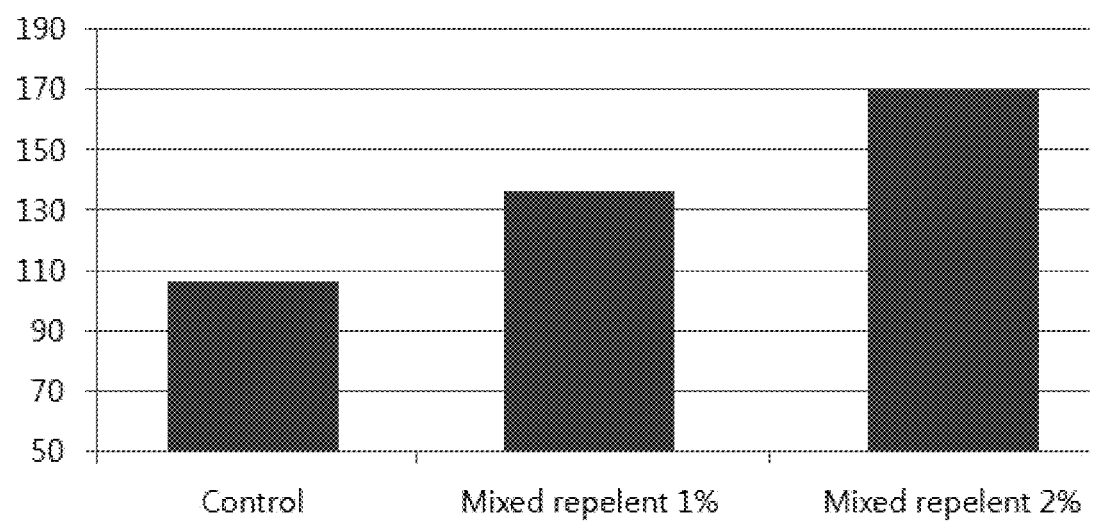
FIG. 11A shows results of evaluating thermal stability of a hot-melt type adhesive that contains the liquid-type repellant that was mixed 1% or 2% by weigh of the plant extract admixing with *C. cassia, S. aromaticum* and *A. capillaris* and that was aged four days in accordance with another example of the present invention.
FIG. 11B is a graph showing results of viscosity change of the liquid-type repellent in accordance with another example of the present invention.
Figure 12:
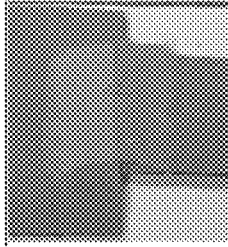
FIG. 12 shows results of evaluating adhesive force of a hot-melt type adhesive that contains the liquid-type repellant that was mixed 1% or 2% by weigh of the plant extract admixing with *C. cassia, S. aromaticum* and *A. capillaris* and that was aged four days in accordance with another example of the present invention.

In addition, we evaluated thermal stability, viscosity changes and adhesion force of the adhesive after the hot-melt adhesive adding the mixed solution as pest repellent was aged for 4 days at 180° C. FIG. 11A shows the result of the thermal stability of the adhesive, FIG. 11B shows the result of the viscosity change of the adhesive, and FIG. 12 shows the result of the adhesion force of the adhesive. While the degree of discoloration and carbonization of the hot-melt type adhesive was a little bit increased after aging, there were no phenomena such as phase separation and precipitation (See FIG. 11A). The viscosity was increased about 30% to 70% compared to the initial viscosity (See FIG. 11B). Also, the hot-melt type adhesive having the mixed repellent showed the adhesion force similar to the control adhesive without containing repellent (See FIG. 12).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An adhesive comprising;
    an anti-insect ingredient comprising a plant extract, wherein the plant extract comprises an extract of *Cinnamomum cassia*, an extract of *Syzygium aromaticum* and an extract of *Artemisia capillaris*; and
    an adhesive ingredient comprising a binder.

2. The adhesive according to claim 1, wherein the extract of *Cinnamomum cassia*, the extract of *Syzygium aromaticum* and the extract of *Artemisia capillaris* are mixed in the plant extract with a weight ratio of about 1 to about 10: about 1 to about 10:about 1 to about 10.

3. The adhesive according to claim 1, wherein the extract of *Cinnamomum cassia*, the extract of *Syzygium aromaticum* and the extract of *Artemisia capillaris* are mixed in the plant extract with weight ratio of about 1 to about 5: about 1 to about 5: about 1 to about 5.

4. The adhesive according to claim 1, wherein the binder is selected from the group consisting of a rubber-based resin, an acryl-based resin, a silicone-based resin, an urethane-based resin, an epoxy-based resin, a polyamide-based resin, an olefin-based resin, an ether-based resin and combination thereof.

5. The adhesive according to claim 1, wherein the binder comprises a rubber-based resin that is selected from the group consisting of a reclaimed rubber-based resin, a butyl rubber-based resin, styrene-isobutylene-styrene block copolymer and combination thereof.

6. The adhesive according to claim 1, wherein the binder comprises an acryl-based resin that comprises a solvent type, an emulsion type, a hot-melt type or a liquid phase curing type.

7. The adhesive according to claim 1, wherein the binder comprises an olefin-based resin that is selected from the group consisting of an isobutylene-maleic acid copolymer, an ethylene-vinyl acetate copolymer, (EVA), polypropylene, poly vinyl chloride (PVC), a copolymer thereof and combination thereof.

8. The adhesive according to claim 1, wherein the binder comprises an ether-based resin that comprises ether-based cellulose.

9. The adhesive according to claim 1, wherein the binder comprises oriented polypropylene.

10. The adhesive according to claim 1, further comprising a functional additive.

11. The adhesive according to claim 9, wherein the functional additive is selected from the group consisting of a chain extender, a curing agent, a tackifier, a plasticizer, an antioxidant, a filler and combination thereof.

12. The adhesive according to claim 1, the adhesive ingredient further comprising a solvent.

13. The adhesive according to claim 8, wherein the solvent is selected from the group consisting of water, an organic solvent and combination thereof.

14. The adhesive according to claim 9, wherein the organic solvent is selected from the group consisting of a hydrocarbon-based solvent, a halogenated hydrocarbon-based solvent, an alcohol-based solvent, an aldehyde-based solvent, an ether-based solvent, an ester-based solvent, a ketone-based solvent, a glycol-ether-based solvent and combination thereof.

15. The adhesive according to claim 1, wherein the adhesive comprises about 0.1% to about 10% by weight of the anti-insect ingredient and about 90% to about 99.9% by weight of the adhesive ingredient.

16. The adhesive according to claim 1, wherein the adhesive comprises about 1% to about 5% by weight of the anti-insect ingredient and about 95% to about 99% by weight of the adhesive ingredient.

17. The adhesive according to claim 1, wherein the adhesive is formulated as an adhesive tape.

18. The adhesive according to claim 1, wherein the adhesive comprises a hot-melt type adhesive.

* * * * *